United States Patent [19]

Nukada et al.

[11] Patent Number: 5,292,604
[45] Date of Patent: Mar. 8, 1994

[54] PHTHALOCYANINE CRYSTAL OF MIXED PIGMENTS AND ELECTROPHOTOGRAPHIC PHOTORECEPTOR USING THE SAME

[75] Inventors: Katsumi Nukada; Akira Imai; Katsumi Daimon; Masakazu Iijima, all of Minami-ashigara, Japan

[73] Assignee: Fuji Xerox Co., Ltd., Japan

[21] Appl. No.: 898,010

[22] Filed: Jun. 16, 1992

[30] Foreign Application Priority Data

Jun. 21, 1991 [JP] Japan .................. 3-175789

[51] Int. Cl.$^5$ .................... G03G 5/00; G03G 15/00
[52] U.S. Cl. .................... 430/78; 430/56
[58] Field of Search .................... 430/78, 56

[56] References Cited

U.S. PATENT DOCUMENTS

| 4,994,566 | 2/1991 | Mimura et al. | 430/78 |
| 5,059,355 | 10/1991 | Ono et al. | 430/59 |
| 5,132,197 | 7/1992 | Iuchi et al. | 430/76 |
| 5,166,339 | 11/1992 | Duff et al. | 540/141 |
| 5,182,382 | 1/1993 | Mayo et al. | 430/78 |
| 5,189,155 | 2/1993 | Mayo et al. | 540/141 |

FOREIGN PATENT DOCUMENTS

| 54-44684 | 12/1979 | Japan . |
| 55-27583 | 7/1980 | Japan . |
| 59-49544 | 3/1984 | Japan . |
| 60-59355 | 4/1985 | Japan . |
| 61-124951 | 6/1986 | Japan . |
| 61-217050 | 9/1986 | Japan . |
| 62-67094 | 3/1987 | Japan . |
| 62-256865 | 11/1987 | Japan . |
| 64-17066 | 1/1989 | Japan . |
| 1-142658 | 6/1989 | Japan . |
| 1-221459 | 9/1989 | Japan . |
| 1-221461 | 9/1989 | Japan . |
| 1-299874 | 12/1989 | Japan . |
| 2-70763 | 3/1990 | Japan . |
| 2-99969 | 4/1990 | Japan . |
| 2-170166 | 6/1990 | Japan . |
| 2-272067 | 11/1990 | Japan . |
| 2-280169 | 11/1990 | Japan . |
| 3-9962 | 1/1991 | Japan . |

Primary Examiner—John Kight, III
Assistant Examiner—T. Mosley
Attorney, Agent, or Firm—Oliff & Berridge

[57] ABSTRACT

A phthalocyanine crystal of mixed pigments of oxytitanium phthalocyanine and a halogenated gallium phthalocyanine or a halogenated indium phthalocyanine is disclosed. The phthalocyanine crystal of mixed pigments is used as a charge generating material which provides an electrophotographic photoreceptor excellent in sensitivity, stability on repeated use, and environmental stability.

18 Claims, 22 Drawing Sheets

PHTHALOCYANINE CRYSTAL OF MIXED PIGMENTS AND ELECTROPHOTOGRAPHIC PHOTORECEPTOR USING THE SAME

FILED OF THE INVENTION

This invention relates to a novel crystal of mixed pigments of oxytitanium phthalocyanine and a halogenated gallium phthalocyanine or a halogenated indium phthalocyanine and an electrophotographic photoreceptor containing the same as a charge generating material.

BACKGROUND OF THE INVENTION

Known charge generating materials having sensitivity in the near infrared region which can be used in electrophotographic photoreceptors include squarylium pigments, bisazo pigments, and phthalocyanine pigments. Of these materials, oxytitanium phthalocyanine has recently been attracting particular attention because of its high sensitivity, and various species thereof having different crystal forms have hitherto been proposed for use as a charge generating material of electrophotographic photoreceptors. For example, the α-crystal form is disclosed in JP-A-61-217050; the β-crystal form in JP-A-59-49544; the C-crystal form in JP-A-62-256865; the D-crystal form in JP-A-62-67094; the Y-crystal form in JP-A-64-17066; the γ-crystal form in JP-A-1-299874; and the ω-crystal form in JP-A-2-99969, respectively (the term "JP-A" as used herein means an "unexamined published Japanese patent application"). Further, the D-, Y-, and γ-crystals forms are known to have an X-ray diffraction peak at a Bragg angle ($2\theta \pm 0.2$) of around 27.2°.

On the other hand, gallium phthalocyanine (see JP-A-1-221459) and indium phthalocyanine (see JP-A-60-59355 and JP-A-61-124951) were also reported to be effective as a charge generating material for electrophotographic photoreceptors.

Additionally, JP-A-1-142658, JP-A-1-221461, JP-A-2-70763, JP-A-2-170166, JP-A-2-272067, and JP-A-2-280169 proposed use of a crystal of mixed pigments or mere mixture of oxytitanium phthalocyanine and other phthalocyanine as a charge generating material.

However, a crystal of mixed pigments of oxytitanium phthalocyanine and a halogenated gallium phthalocyanine or a halogenated indium phthalocyanine has not yet been reported.

While the above-described known oxytitanium phthalocyanine species and crystals of mixed pigments thereof are useful as a charge generating material, they are still unsatisfactory. For example, the oxytitanium phthalocyanine having the maximum diffraction peak at a Bragg angle ($2\theta \pm 0.2°$) of 27.3°, disclosed in JP-A-62-67094 supra, exhibits very high sensitivity but is still insufficient in stability on repeated use, crystal form stability in a coating composition, and dispersibility in a coating composition. In order to settle these problems, it has been proposed to mix oxytitanium phthalocyanine with a small amount of a substituted phthalocyanine as described, e.g., in JP-A-3-9962, JP-B-55-27583, and JP-B-54-44684 (the term "JP-B" as used herein means an "examined Japanese patent publication"). In this case, however, since a substituted phthalocyanine is markedly different from unsubstituted phthalocyanine in crystal form, mixing them gives rise to another problem, such as reduction in electrophotographic characteristics.

SUMMARY OF THE INVENTION

Accordingly, an object of the present invention is to provide a crystal of mixed pigments containing oxytitanium phthalocyanine which is suitable for producing an electrophotographic photoreceptor having excellent stability on repeated use and excellent environmental stability.

Another object of the present invention is to provide an electrophotographic photoreceptor excellent in stability on repeated use and stability to environment.

The inventors have conducted extensive investigations on crystal forms of various phthalocyanine complexes with the purpose of developing an electrophotographic photoreceptor excellent in electrophotographic characteristics and productivity. As a result, they found a wonderful similarity in crystal form between a halogenated gallium phthalocyanine or a halogenated indium phthalocyanine and oxytitanium phthalocyanine. Based on this finding, they have reached the fact that the similarity in crystal form makes it possible to form a crystal of mixed pigments between the former and the latter while controlling the crystal form of the crystal of mixed pigments by selecting a mixing ratio. It has also been confirmed that such a novel crystal of mixed pigments is excellent in crystal form stability, dispersibility, and sensitivity and therefore quite suited for use in electrophotographic photoreceptors.

The phthalocyanine crystal of mixed pigments according to the present invention is a crystal of mixed pigments of oxytitanium phthalocyanine and a halogenated gallium phthalocyanine or a halogenated indium phthalocyanine.

BRIEF DESCRIPTION OF THE ACCOMPANYING DRAWINGS

Figure 40A:
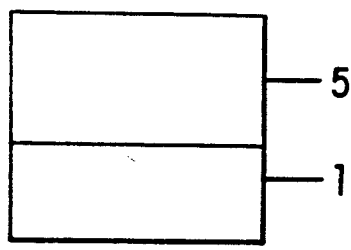
Figure 40B:
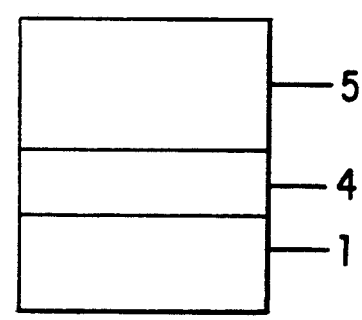

FIGS. 39 and 40 each schematically illustrate the layer structure of the electrophotographic photoreceptor of the present invention.

DETAILED DESCRIPTION OF THE INVENTION

The crystal of mixed pigments of oxytitanium phthalocyanine and a halogenated gallium phthalocyanine according to the present invention (hereinafter referred to as phthalocyanine mixed crystal) preferably includes those having the maximum X-ray diffraction peak at a Bragg angle ($2\theta \pm 0.2°$) of 27.2°.

More preferred oxytitanium phthalocyanine-halogenated gallium phthalocyanine crystals include the following species.

(a) Crystal having strong peaks at Bragg angles of 8.9° and 27.0°.

(b) Crystals having strong peaks at Bragg angles of 9.3°, 10.6°, 13.3°, 15.1°, and 26.3°.

(c) Crystals having strong peaks at Bragg angles of 7.4°, 11.1°, 17.9°, 20.1°, 26.6°, and 29.2°.

(d) Crystals having strong peaks at Bragg angles of 7.5°, 16.7°, 22.1°, 24.7°, 25.6°, and 28.6°.

(e) Crystals having strong peaks at bragg angles of 7.6°, 16.7°, 22.5°, 24.2°, 25.3°, and 28.6°.

The crystal of mixed pigments of oxytitanium phthalocyanine and a halogenated indium phthalocyanine according to the present invention preferably includes the crystals of mixed pigments of oxytitanium phthalocyanine and chloroindium phthalocyanine. Specific examples of preferred oxytitanium phthalocyanine-halogenated indium phthalocyanine crystals include the following species.

(f) Crystals having strong peaks at Bragg angles of 7.6°, 16.4°, 22.4°, 25.5°, and 28.6°.

(g) Crystals having strong peaks at Bragg angles of 7.6°, 10.6°, 15.2°, 26.3°, and 28.7°.

(h) Crystals having strong peaks at Bragg angles of 7.5°, 11.1°, 18.1°, 20.3°, 26.7°, and 29.2°.

(i) Crystals having strong peaks at Bragg angles of 9.4°, 15.2°, 26.4°, and 27.4°.

(j) Crystal having strong peaks at Bragg angles of 7.4°, 16.6°, 25.3°, and 28.2°.

(k) Crystals having strong peaks at Bragg angles of 7.3°, 16.7°, 25.3°, and 27.8°.

The phthalocyanine crystal of mixed pigments of the present invention can be prepared by using oxytitanium phthalocyanine and a halogenated gallium phthalocyanine or a halogenated indium phthalocyanine.

Oxytitanium phthalocyanine may be synthesized by known processes, such as a process comprising reacting phthalonitrile and titanium tetrachloride in an appropriate organic solvent, followed by hydrolysis, and a process comprising reacting diiminoisoindoline and a titanium tetraalkoxide in an appropriate organic solvent.

A halogenated gallium phthalocyanine or a halogenated indium phthalocyanine may be synthesized by known processes, such as a process comprising reacting a trihalogenated gallium or a trihalogenated indium with phthalonitrile or diiminoisoindoline in an appropriate organic solvent.

In the preparation of the phthalocyanine crystal of mixed pigments of the present invention, oxytitanium phthalocyanine and a halogenated gallium or indium phthalocyanine are mixed at an appropriate ratio, and the mixture is ground by dry grinding or milling (e.g., salt milling) in a ball mill, a sand mill, a kneader, a mortar, etc. until the X-ray diffraction spectrum of the ground mixture reveals no clear peak. Alternatively, each of the starting phthalocyanine compounds is separately ground to become non-crystalline and then mixed together to prepare the crystal of mixed pigments. Then, the resulting crystal of mixed pigments is treated with an organic solvent. Examples of useful organic solvents include halogenated hydrocarbons, e.g., methylene chloride and chloroform; aromatic hydrocarbons, e.g., toluene, benzene, and chlorobenzene; alcohols, e.g., methanol and ethanol; ketones, e.g., acetone and methyl ethyl ketone; acetic esters, e.g., ethyl acetate and butyl acetate; aliphatic hydrocarbons, e.g., hexane and octane; ethers e.g., diethyl ether, dioxane, and tetrahydrofuran; and mixtures of these organic solvents, or mixtures of these organic solvents and water. The amount of the solvent to be used and the solvent treating time are not particularly limited.

It is also effective that the starting phthalocyanine compounds are treated with a solvent, such as dimethylformamide (DMF), N-methylpyrrolidone (NMP), tetrahydrofuran (THF), methylene chloride, or sulfolane prior to the grinding step. It is also effective that the solvent treatment of the mixture be conducted while milling in a ball mill, a sand mill, etc.

The crystal of mixed pigments of the present invention preferably forms a solid solution of pigments. Further, it is more preferred that the crystal of mixed pigments is treated with a solvent so as to have a definite X-ray diffraction peak at a Bragg angle.

The phthalocyanine crystal of mixed pigments of the present invention is useful as a charge generating material for electrophotography and provides an electrophotographic photoreceptor excellent in stability on repeated use and environmental stability.

Illustrative examples of the structure of the photoreceptor using the phthalocyanine crystal of mixed pigments of the present invention are explained below by referring to FIGS. 39 and 40.

FIGS. 39-(a) through (d) show photoreceptors having a laminate structure. The photoreceptor shown in FIG. 39-(a) is composed of conductive substrate 1 having thereon charge generating layer 2 and charge transporting layer 3 in this order. The photoreceptor shown in FIG. 39-(b) is composed of conductive substrate 1 having thereon charge transporting layer 3 and charge generating layer 2 in this order. The photoreceptors shown in FIGS. 39-(c) and (d) additionally have subbing layer 4 on conductive substrate 1. FIGS. 40-(a) and (b) show photoreceptors having a single layer structure, in which photoconductive layer 5 is provided on conductive substrate 1 with or without subbing layer 4.

Where a photoreceptor has a laminate structure as shown in FIG. 39, the charge generating layer comprises the phthalocyanine crystal of mixed pigments of the present invention and a binder resin. The binder resin to be used is selected from a wide range of insulating resins or organic photoconductive polymers, e.g., poly-N-vinyl carbazole, polyvinyl anthracene, and polyvinyl pyrene. Examples of suitable binder resins are insulating resins, such as polyvinyl butyral, polyarylates (e.g., a polycondensate of bisphenol A and phthalic acid), polycarbonates, polyesters, phenoxy resins, vinyl chloride-vinyl acetate copolymers, polyvinyl acetate, acrylic resins, polyacrylamide, polyamides, polyvinyl pyridine, cellulose resins, urethane resins, epoxy resins, casein, polyvinyl alcohol, and polyvinyl pyrrolidone.

The charge generating layer is formed by coating on a conductive substrate a coating composition prepared by dispersing the phthalocyanine crystal of mixed pigments of the present invention in a solution of the binder resin dissolved in an organic solvent. A compounding ratio of the phthalocyanine crystal of mixed pigments to the binder resin ranges from 40:1 to 1:10, and preferably from 10:1 to 1:4, by weight. If the ratio of the phthalocyanine crystal of mixed pigments is too high, the stability of the coating composition would be reduced. If it is too low, the sensitivity of the charge generating layer would be reduced.

The solvents to be used in the coating composition are preferably selected from those incapable of dissolving the lower layer, i.e., the layer provided right under the charge generating layer. Examples of suitable organic solvents include alcohols, e.g., methanol, ethanol, and isopropanol; ketones, e.g., acetone, methyl ethyl ketone, and cyclohexanone; amides, e.g., N,N-dimethylformamide and N,N-dimethylacetamide; dimethyl sulfoxides; ethers, e.g., tetrahydrofuran, dioxane, and ethylene glycol monomethyl ether; esters, e.g., methyl acetate and ethyl acetate; halogenated aliphatic hydrocarbons, e.g., chloroform, methylene chloride, dichloroethylene, carbon tetrachloride, and trichloroethylene; and aromatic hydrocarbons, e.g., benzene, toluene, xylene, ligroin, monochlorobenzene, and dichlorobenzene.

The coating composition for a charge generating layer can be coated by any known coating technique, such as dip coating, spray coating, spinner coating, bead coating, wire bar coating, blade coating, roller coating, and curtain coating. Drying after coating is preferably carried out first by drying in high temperatures to the touch and then heat-drying. Heat-drying may be performed at a temperature of from 50° to 200° C. for a period of from 5 minutes to 2 hours in still air or in an air flow. The charge generating layer usually has a thickness of from about 0.05 to 5 μm.

The charge transporting layer of the laminate structure comprises a charge transporting material and a binder resin. Any of known charge transporting materials including polycyclic aromatic compounds, e.g., anthracene, pyrene, and phenanthrene; compounds having a nitrogen-containing heterocyclic ring, e.g., indole, carbazole, and imidazole; pyrazoline compounds, hydrazone compounds, triphenylmethane compounds, triphenylamine compounds, enamine compounds, and stilbene compounds, may be employed.

Also included in usable charge transporting materials are photoconductive polymers, such as poly-N-vinyl carbazole, halogenated poly-N-vinyl carbazole, polyvinyl anthracene, poly-N-vinylphenyl anthracene, polyvinyl pyrene, polyvinyl acridine, polyvinyl acenaphthylene, polyglycidyl carbazole, pyreneformaldehyde resins, and ethyl carbazole-formaldehyde resins. These photoconductive polymers may be used alone for formation of a charge transporting layer without the aid of a binder resin.

The same binder resins as used in the charge generating layer can be used in the charge transporting layer.

The charge transporting layer can be formed by coating a substrate with a coating composition comprising the above-described charge transporting material, a binder resin, and an organic solvent incapable of dissolving the lower layer. The solvent and the coating technique to be used are the same as described for the formation of the charge generating layer. A compounding ratio of the charge transporting material to the binder resin usually ranges from 5:1 to 1:5 by weight. The charge transporting layer usually has a thickness of from about 5 to 50 μm.

Where a photoreceptor has a single layer structure as shown in FIG. 40, the photosensitive layer is a photoconductive layer comprising a binder resin having dispersed therein a charge transporting material and the phthalocyanine crystal of mixed pigments according to the present invention. A compounding ratio of the charge transporting material to the binder resin preferably ranges from 1:20 to 5:1 by weight, and a compounding ratio of the phthalocyanine crystal of mixed pigments to the charge transporting material preferably ranges from about 1:10 to 10:1 by weight. The charge transporting material and binder resin to be used are the same as described above. Formation of the photoconductive layer can be effected in the same manner as described above.

Any of conventional conductive substrates known for electrophotographic photoreceptors can be used in the present invention.

If desired, a subbing layer may be provided on the conductive substrate. The subbing layer is effective for inhibiting injection of unnecessary charges from the conductive substrate thereby serving to enhance chargeability of the photosensitive layer. It also functions to increase adhesion between the photosensitive layer and the conductive substrate.

Materials constituting the subbing layer include polyvinyl alcohol, polyvinyl pyrrolidone, polyvinyl pyridine, cellulose ethers, cellulose esters, polyamides, polyurethanes, casein, gelatin, polyglutamic acid, starch, starch acetate, amino starch, polyacrylic acid, polyacrylamide, zirconium chelate compounds, zirconium alkoxide compounds, organozirconium compounds, titanyl chelate compounds, titanyl alkoxide compounds, organotitanium compounds, and silane coupling agents. The subbing layer usually has a thickness of from about 0.05 to 2 μm.

The present invention is now illustrated by way of Synthesis Examples, Examples, and Comparative Examples, but it should be understood that the present invention is not deemed to be limited thereto. All the percents and parts are given by weight unless otherwise indicated. All the mixing ratios of solvents in mixed solvents are given by volume.

For obtaining X-ray diffraction pattern, X-ray diffractometry was conducted by measuring the intensity of Bragg angle (2θ) to the characteristic X-rays (wavelength 1.541 Å) of CuKα with the following measurement conditions:

| | |
|---|---|
| X-ray diffractometer: | RAD-RC manufactured by Rigaku K.K. |
| X-ray tube output: | 18 KW |
| Target: | Cu (1.54050 Å) |
| Voltage: | 40.0 KV |
| Current: | 300.0 mA |
| Start angle: | 5.00 deg |
| Stop angle: | 40.00 deg |
| Step angle: | 0.020 deg |

SYNTHESIS EXAMPLE 1

Figure 1:
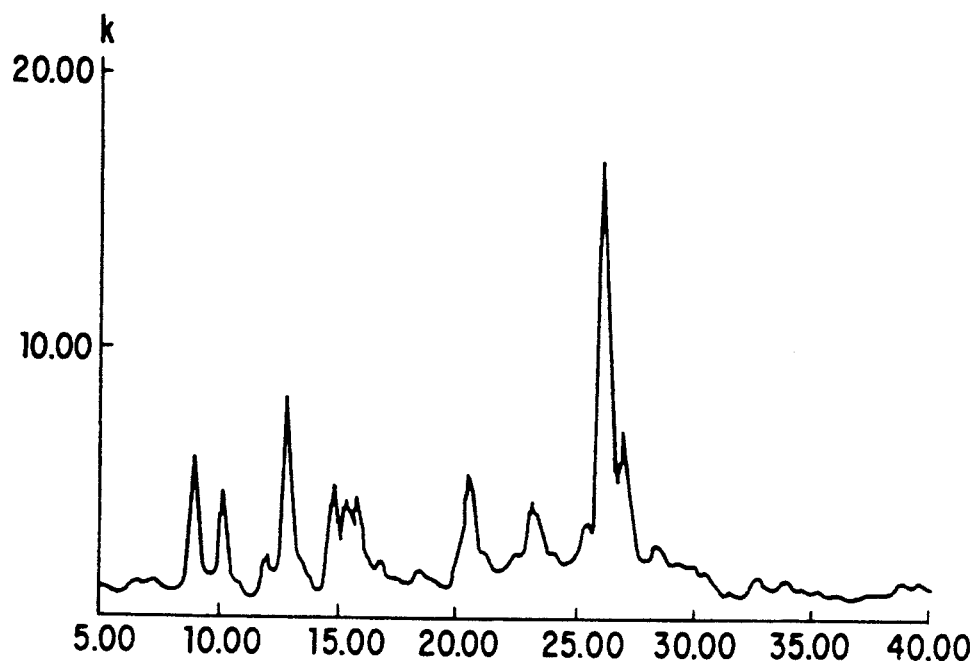
FIG. 1 is a powder X-ray diffraction pattern of an oxytitanium phthalocyanine crystal.

Thirty parts of 1,3-diiminoisoindoline and 17 parts of titanium tetrabutoxide were added to 200 parts of 1-chloronaphthalene, and the mixture was allowed to react at 190° C. for 5 hours in a nitrogen stream. The reaction mixture was filtered, and the filter cake was washed successively with aqueous ammonia, water, and acetone to obtain 40 parts of oxytitanium phthalocyanine. The powder X-ray diffraction pattern of the resulting oxytitanium phthalocyanine crystal is shown in FIG. 1.

SYNTHESIS EXAMPLE 2

Figure 2:
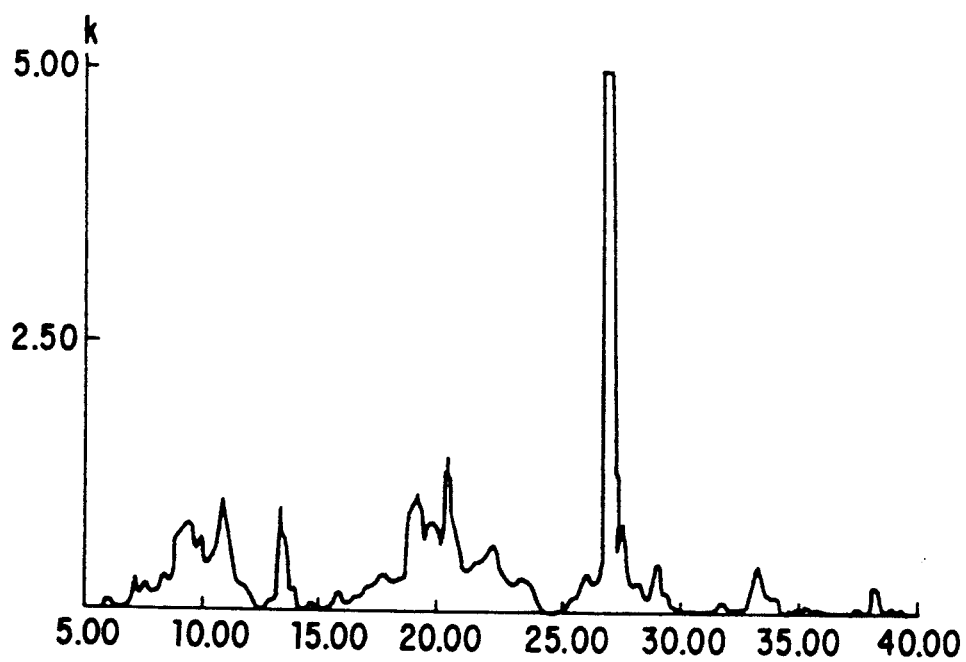
FIG. 2 is a powder X-ray diffraction pattern of a chlorogallium phthalocyanine crystal.

Thirty parts of 1,3-diiminoisoindoline and 9.1 parts of gallium trichloride were added to 230 parts of quinoline, and the mixture was allowed to react at 200° C. for 3 hours in a nitrogen stream. The reaction mixture was filtered, and the filter cake was washed successively with acetone and methanol and dried to obtain 28 parts of chlorogallium phthalocyanine. The powder X-ray diffraction pattern of the resulting chlorogallium phthalocyanine crystal is shown in FIG. 2.

SYNTHESIS EXAMPLE 3

Figure 3:
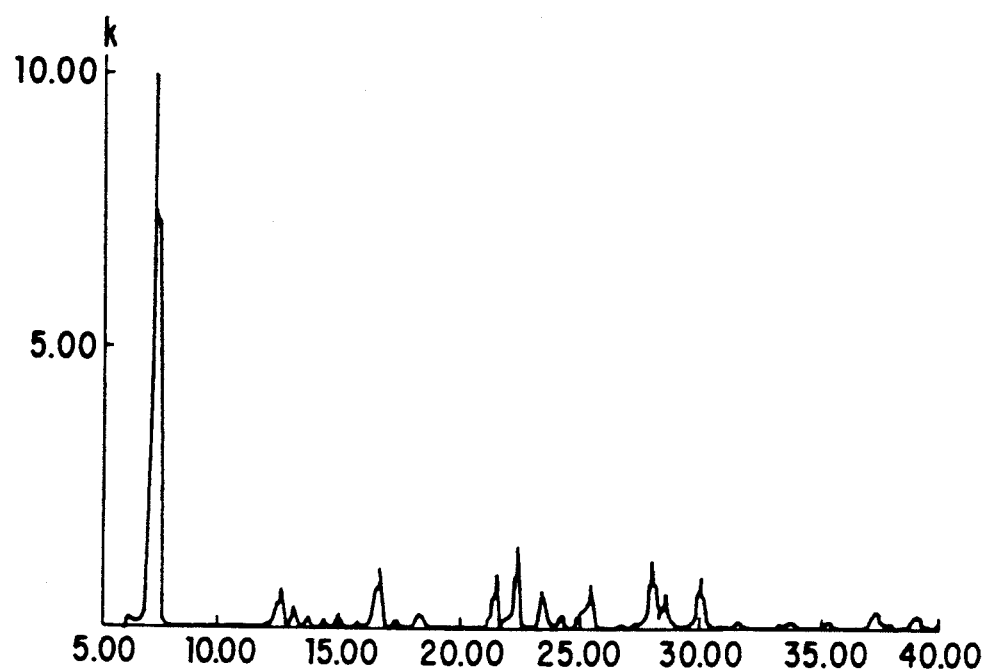
FIG. 3 is a powder X-ray diffraction pattern of a chloroindium phthalocyanine crystal.

Thirty parts of 1,3-diiminoisoindoline and 12.3 parts of indium trichloride were added to 230 parts of quinoline, and the mixture was allowed to react at 200° C. for 5 hours in a nitrogen stream. The reaction mixture was filtered, and the filter cake was washed successively with acetone and methanol and dried to obtain 16.2 parts of chloroindium phthalocyanine. The powder X-ray diffraction pattern of the resulting chloroindium phthalocyanine crystal is shown in FIG. 3.

EXAMPLE 1

Figure 4:
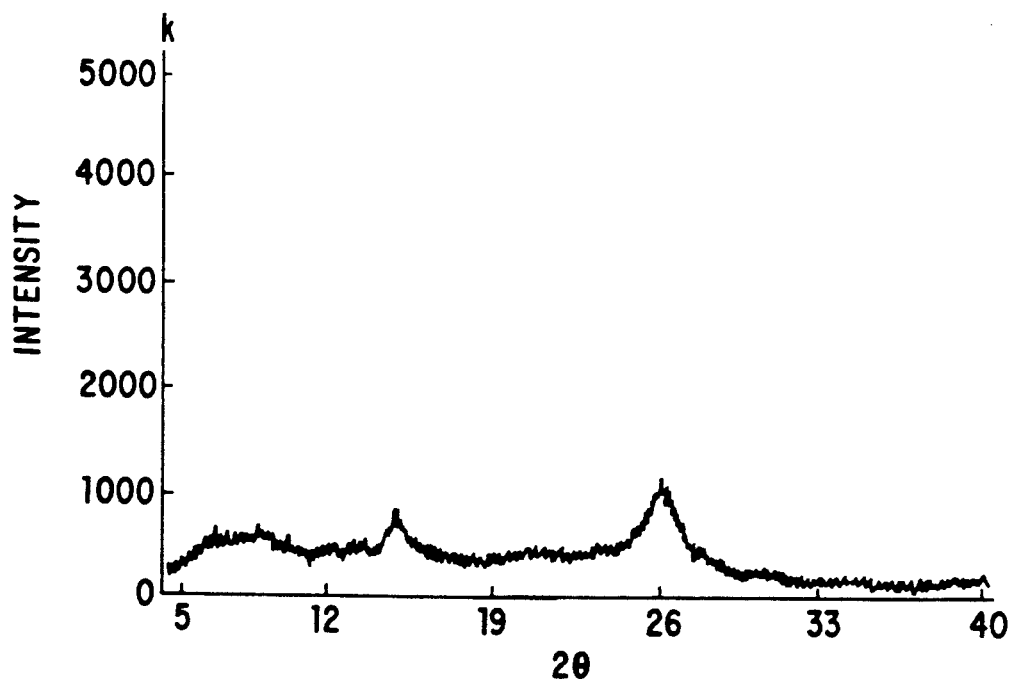
FIGS. 4 to 11 are powder X-ray diffraction patterns of the oxytitanium phthalocyanine-chlorogallium phthalocyanine crystals obtained in Examples 1, 2, 3, 7, 10, 11, 12, and 14, respectively.

Nine parts of the oxytitanium phthalocyanine crystal obtained in Synthesis Example 1 and 1 part of the chlorogallium phthalocyanine crystal obtained in Synthesis Example 2 were ground in an automatic mortar ("LABO-MILL UT-21" manufactured by Yamato Kagaku) for 10 hours. The powder X-ray diffraction pattern of the resulting powder is shown in FIG. 4.

EXAMPLE 2

Figure 5:
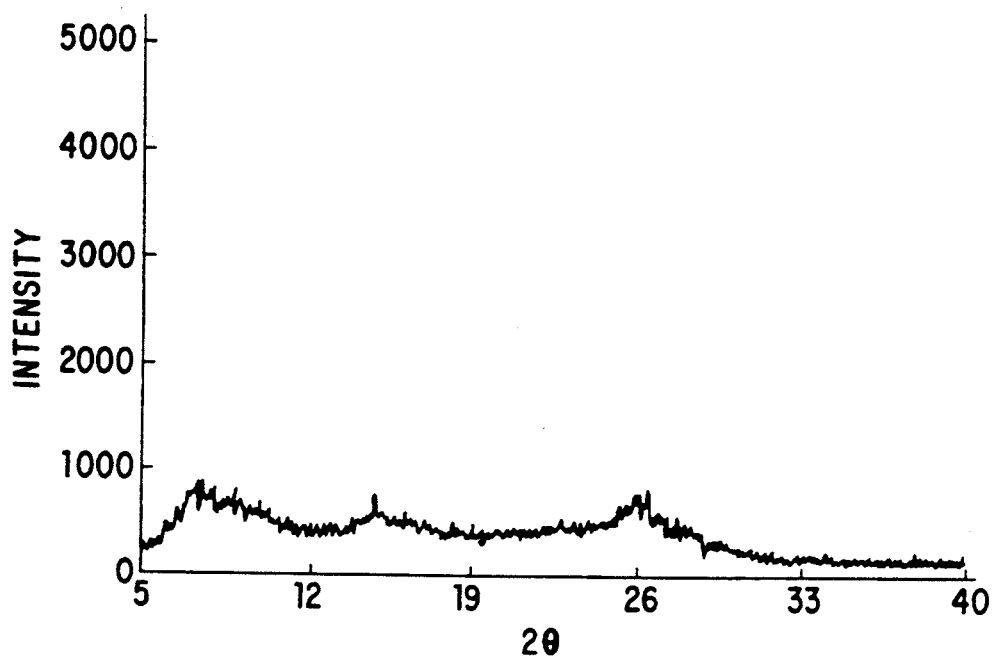

Five parts of the oxytitanium phthalocyanine crystal obtained in Synthesis Example 1 and 5 parts of the chlorogallium phthalocyanine crystal obtained in Synthesis Example 2 were ground in an automatic mortar "LABO-MILL UT-21" for 10 hours. The powder X-ray diffraction pattern of the resulting powder is shown in FIG. 5.

EXAMPLE 3

Figure 6:
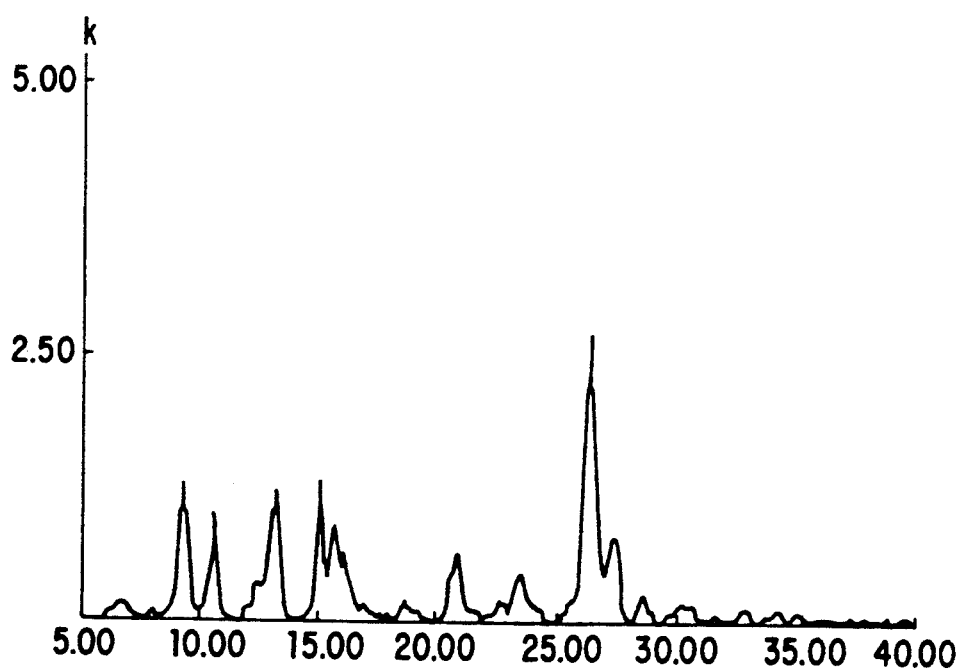

In a 100 parts-volume glass container were put 0.5 part of the crystal of mixed pigments obtained in Example 1 and 15 parts of methylene chloride together with 30 g of glass beads (diameter: 1 mm), and the crystal was subjected to milling at 150 rpm for 24 hours. The crystals were collected by filtration and dried to obtain 0.4 part of an oxytitanium phthalocyanine-chlorogallium phthalocyanine crystal of the present invention. The powder X-ray diffraction pattern of the resulting crystal of mixed pigments is shown in FIG. 6.

EXAMPLES 4 TO 16

The crystal of mixed pigments obtained in Examples 1 or 2 were treated with the solvent shown in Table 1 below in the same manner as in Example 3. The Figure No. of the powder X-ray diffraction pattern of the resulting crystal of mixed pigments is shown in Table 1.

TABLE 1

Figure 7:
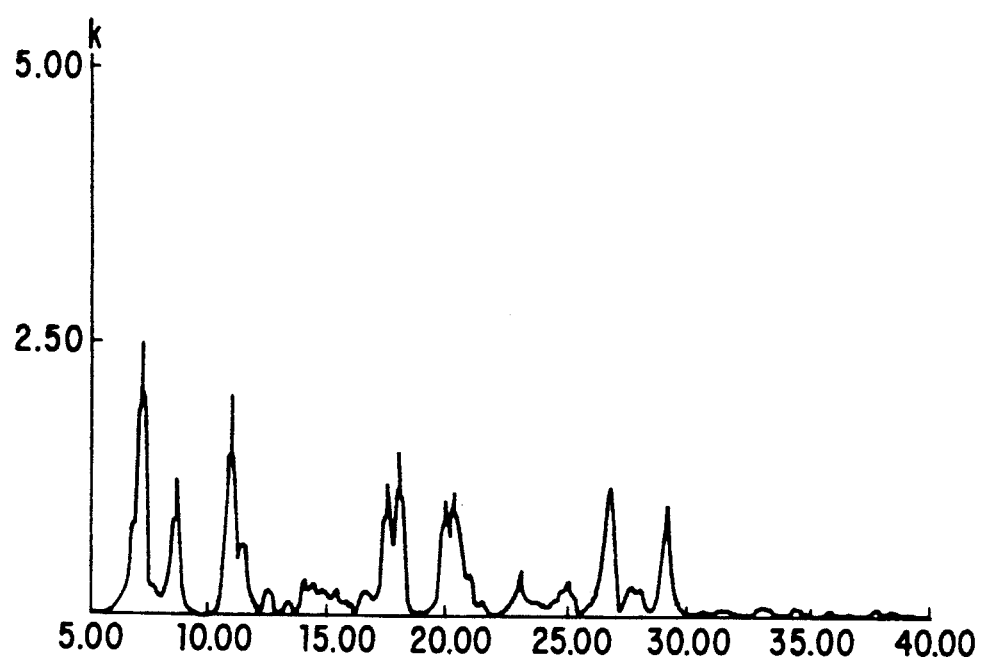
Figure 8:
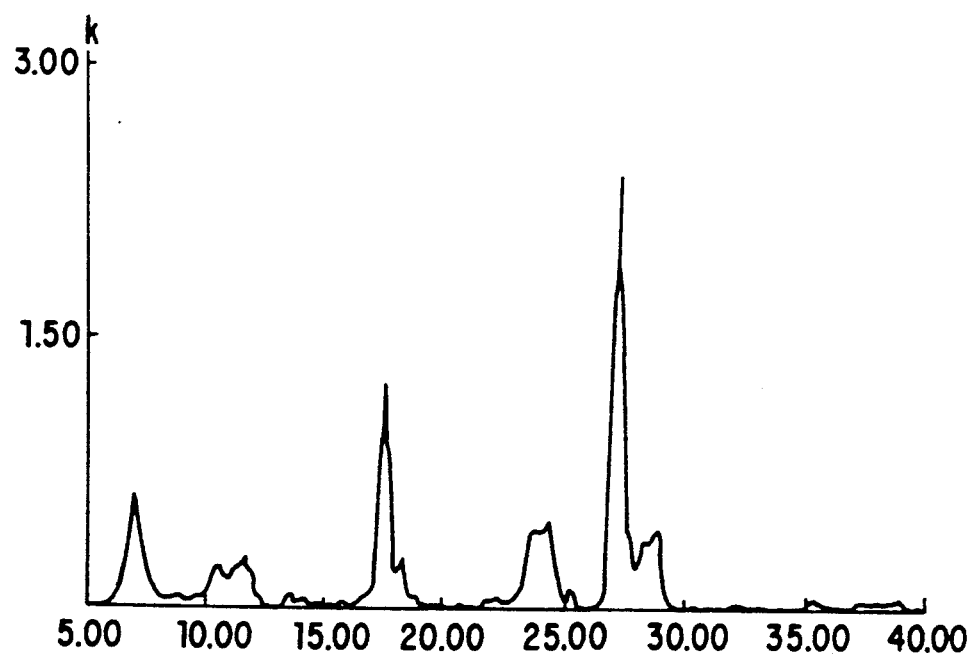
Figure 9:
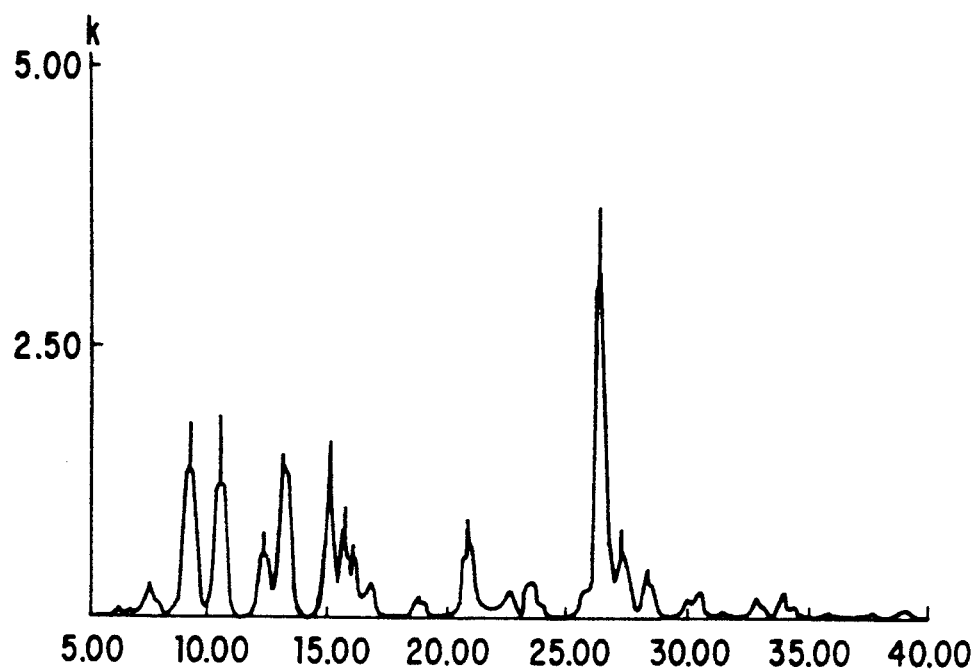
Figure 10:
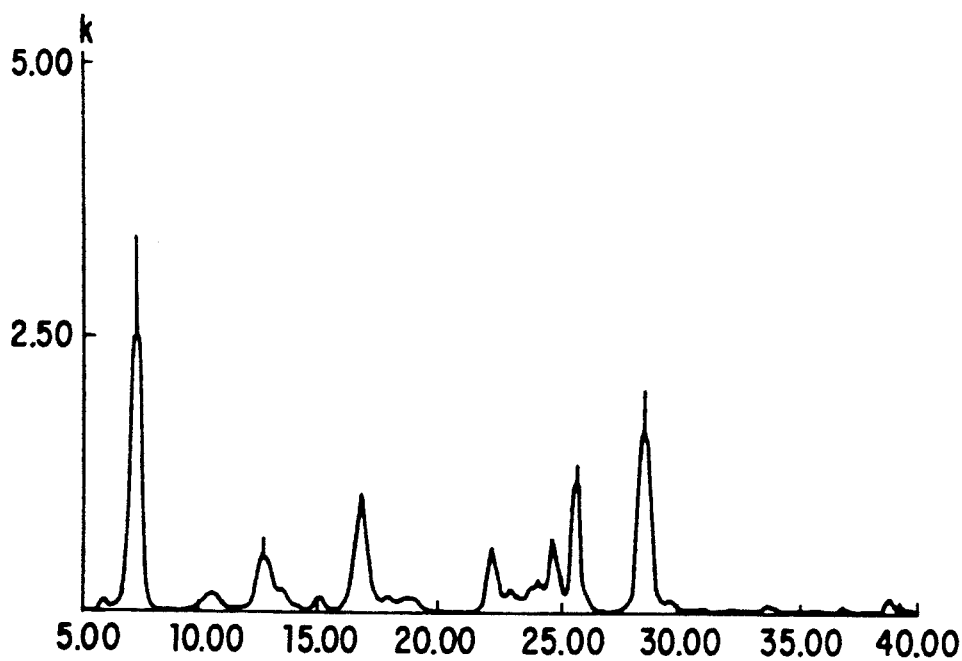
Figure 11:
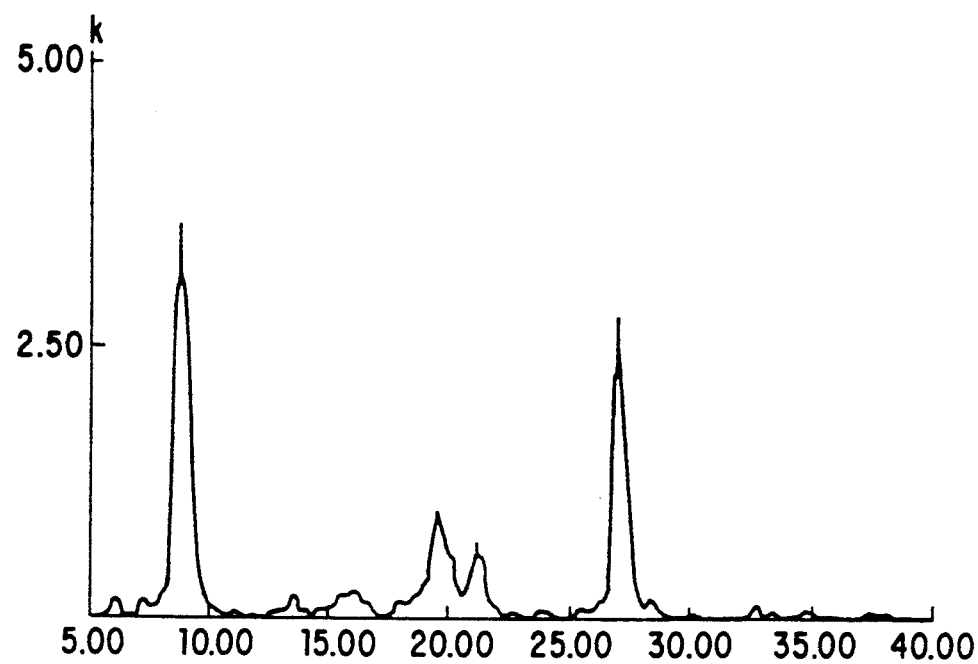

| Example No. | Crystal of Mixed Pigments | Solvent | X-ray Diffraction Pattern |
|---|---|---|---|
| 4 | Example 1 | monochlorobenzene | the same as FIG. 6 |
| 5 | " | THF | the same as FIG. 6 |
| 6 | " | methyl ethyl ketone | the same as FIG. 6 |
| 7 | " | ethylene glycol | FIG. 7 |
| 8 | " | DMF | the same as FIG. 6 |
| 9 | " | water/monochlorobenzene = 1/14 | the same as FIG. 6 |
| 10 | Example 2 | methylene chloride | FIG. 8 |
| 11 | " | monochlorobenzene | FIG. 9 |
| 12 | " | THF | FIG. 10 |
| 13 | " | methyl ethyl ketone | the same as FIG. 10 |
| 14 | " | ethylene glycol | FIG. 11 |
| 15 | " | DMF | the same as FIG. 10 |
| 16 | " | water/monochlorobenzene = 1/14 | the same as FIG. 9 |

EXAMPLE 17

Figure 12:
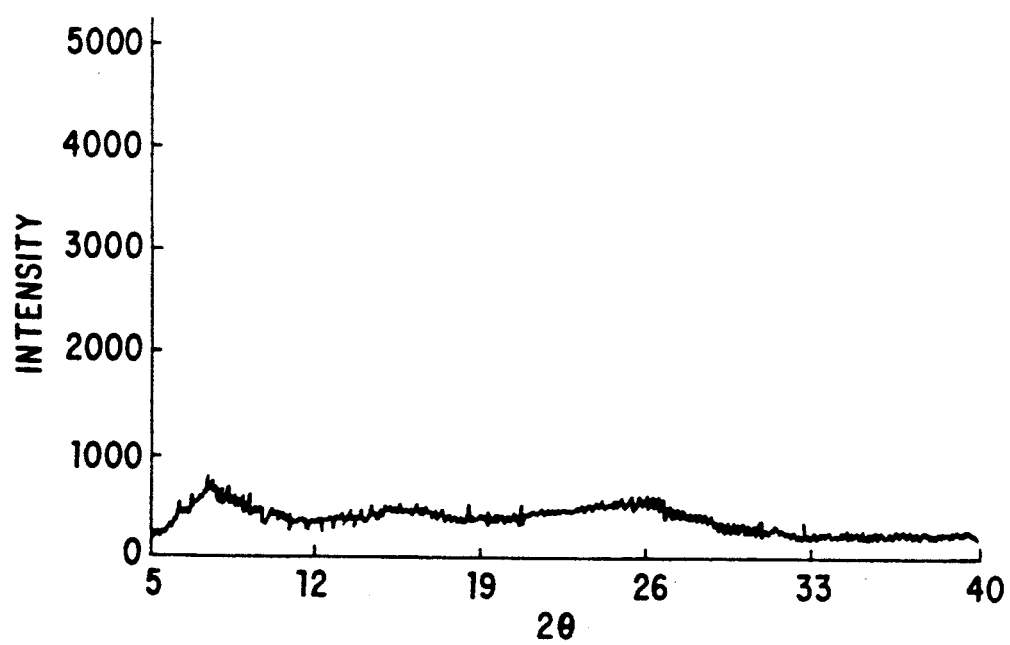
FIGS. 12 to 19 are powder X-ray diffractions pattern of the oxytitanium phthalocyanine-chloroindium phthalocyanine crystals obtained in Examples 17, 18, 19, 20, 23, 25, 26, and 30, respectively.

Nine parts of the oxytitanium phthalocyanine crystal obtained in Synthesis Example 1 and 1 part of the chloroindium phthalocyanine crystal obtained in Synthesis Example 3 were ground in an automatic mortar "LABO-MILL UT-21" for 10 hours. The powder X-ray diffraction pattern of the resulting powder is shown in FIG. 12.

EXAMPLE 18

Figure 13:
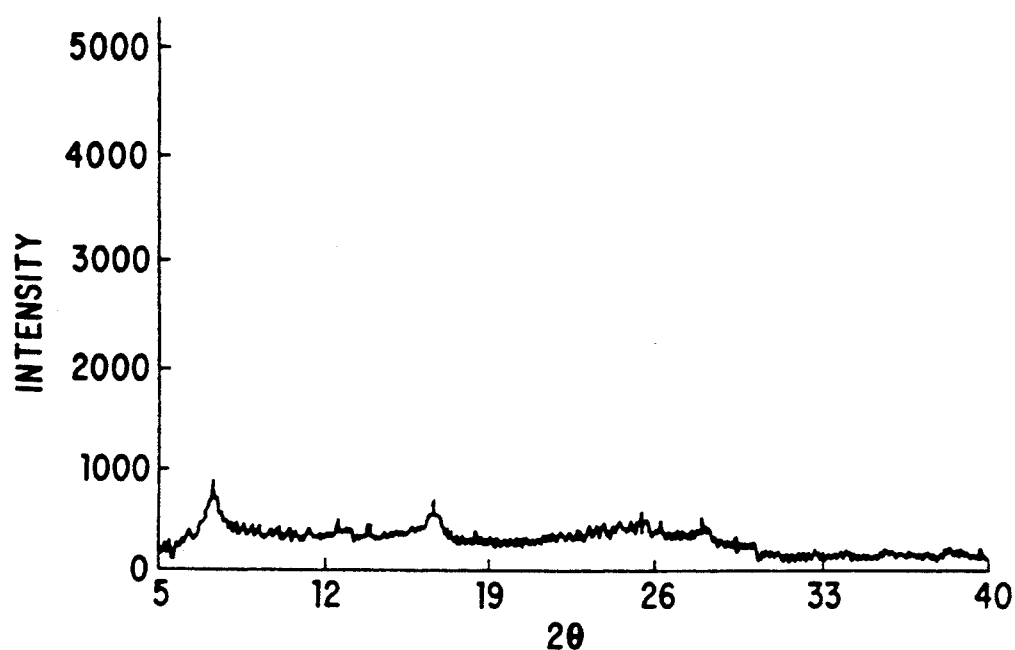

Five parts of the oxytitanium phthalocyanine crystal obtained in Synthesis Example 1 and 5 parts of the chloroindium phthalocyanine crystal obtained in Synthesis Example 3 were ground in an automatic mortar "LABO-MILL UT-21" for 10 hours. The powder X-ray diffraction pattern of the resulting powder is shown in FIG. 13.

EXAMPLE 19

Figure 14:
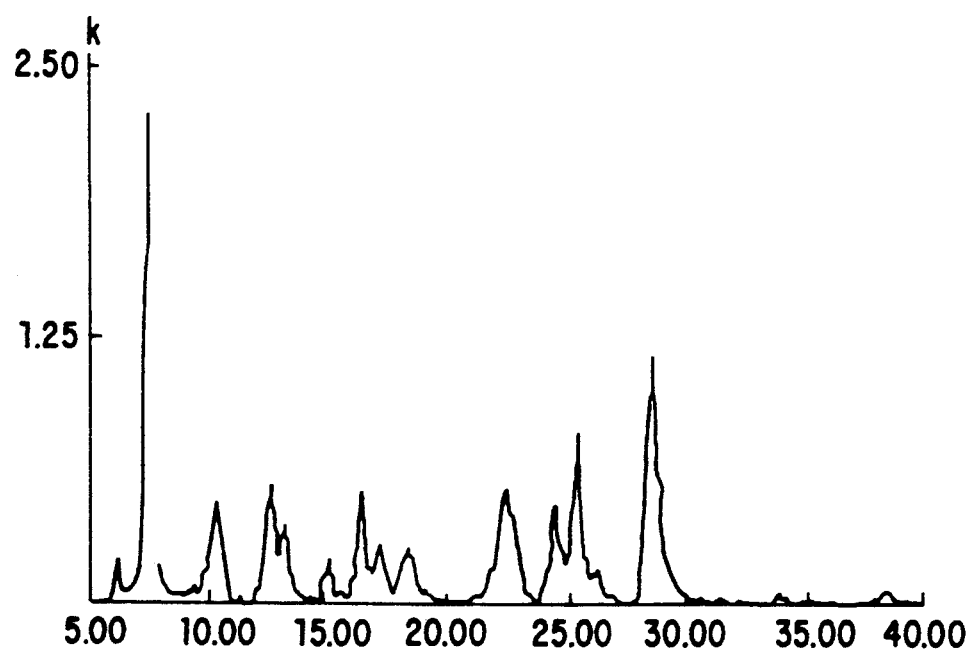

In a 100 parts-volume glass container were put 0.5 part of the crystal of mixed pigments obtained in Example 17 and 15 parts of methylene chloride together with 30 g of glass beads (diameter: 1 mm), and the crystal was subjected to milling at 150 rpm for 24 hours. The crystals were collected by filtration and dried to obtain 0.4 part of an oxytitanium phthalocyanine-chloroindium phthalocyanine crystal of pigments. The powder X-ray diffraction pattern of the resulting crystal of mixed pigments is shown in FIG. 14.

EXAMPLES 20 TO 32

The crystal of mixed pigments obtained in Examples 17 or 18 was treated with the solvent shown in Table 2 below in the same manner as in Example 3. The Figure No. of the powder X-ray diffraction pattern of the resulting crystal of mixed pigments is shown in Table 2.

TABLE 2

Figure 15:
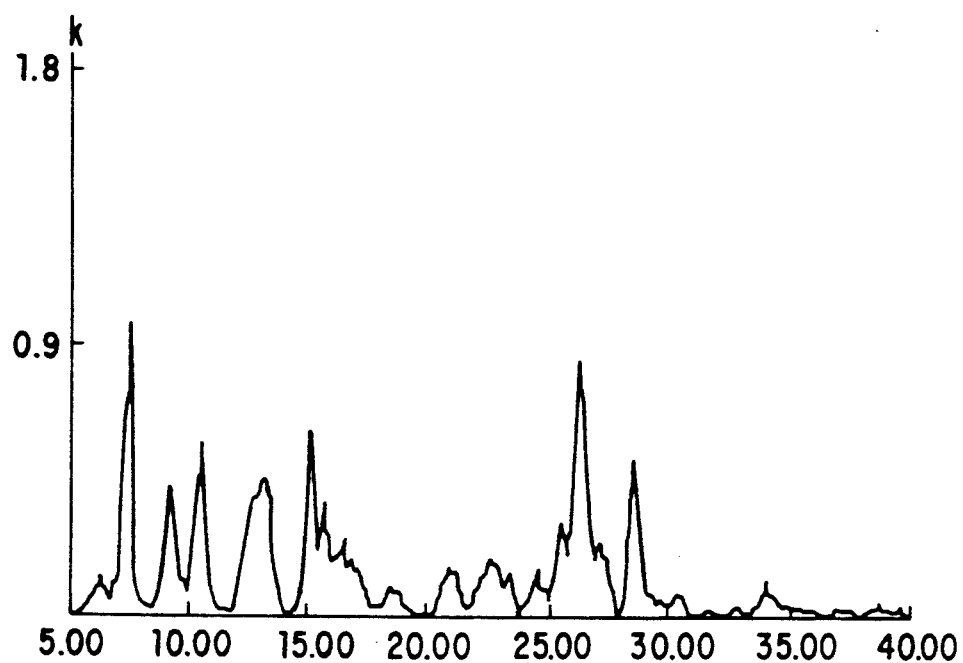
Figure 16:
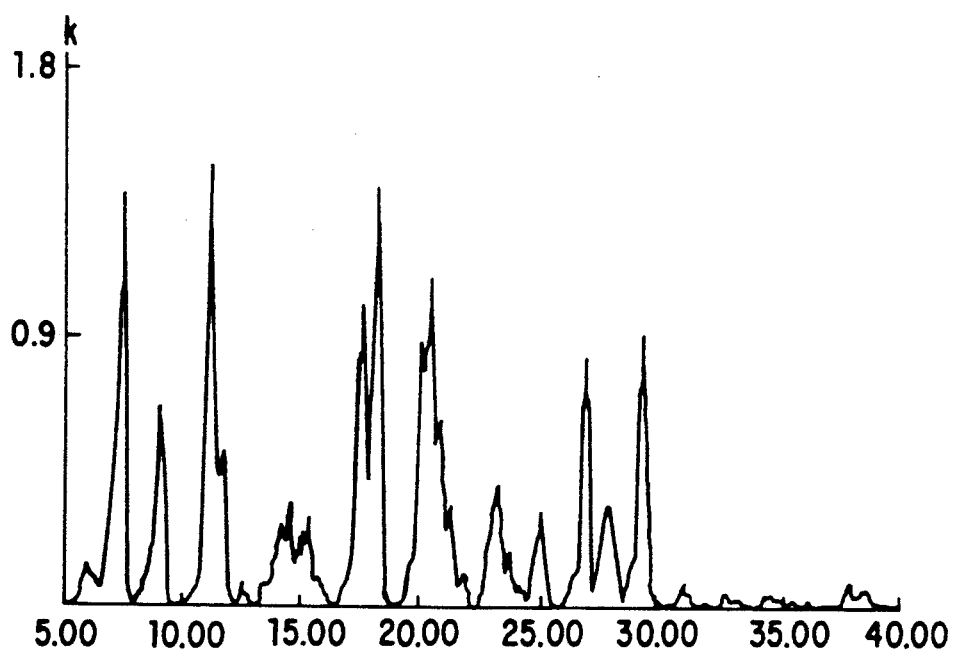
Figure 17:
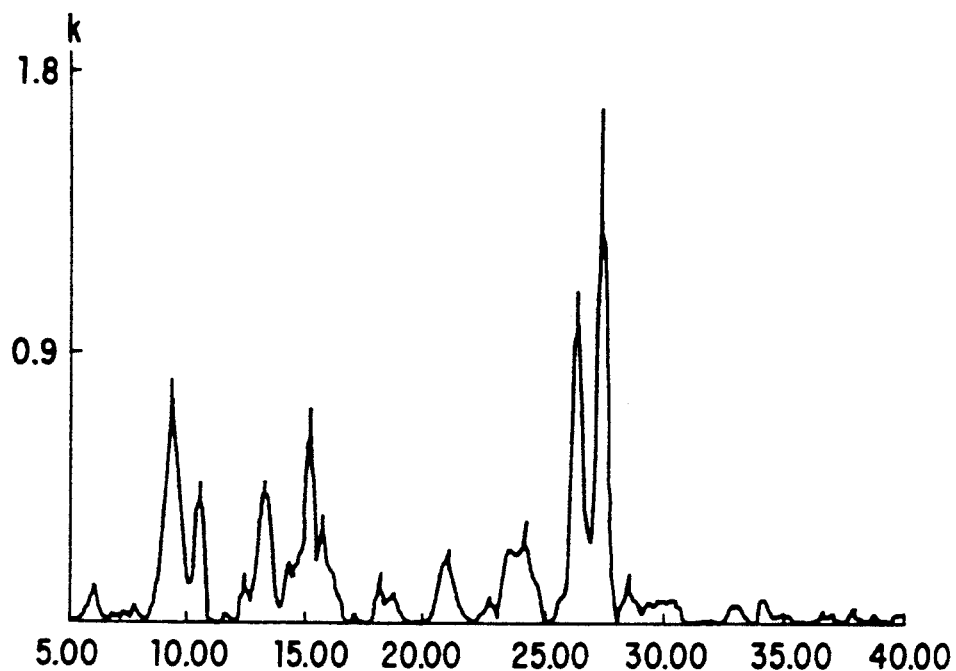
Figure 18:
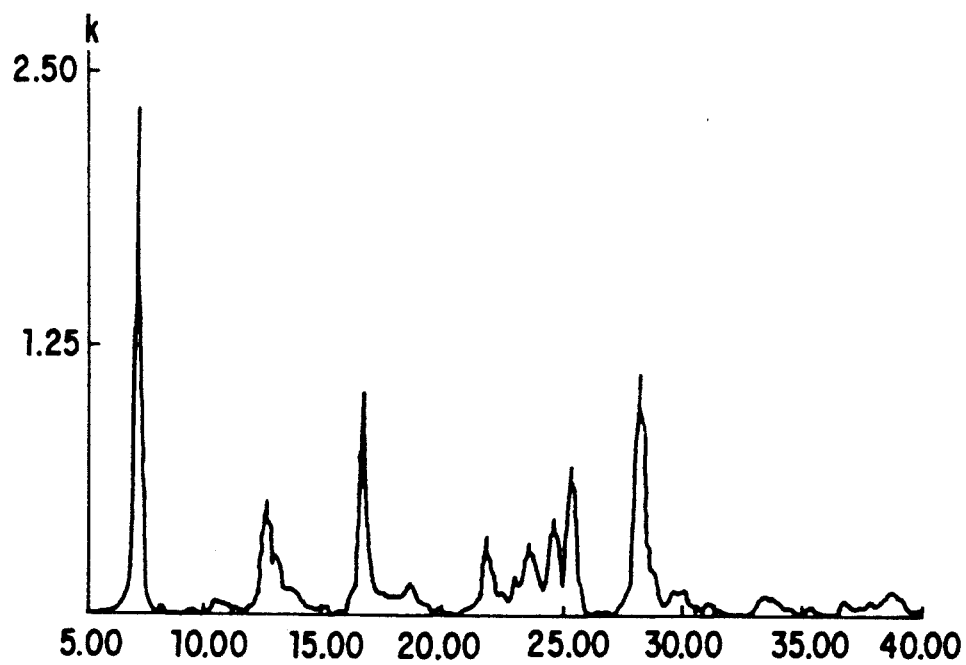
Figure 19:
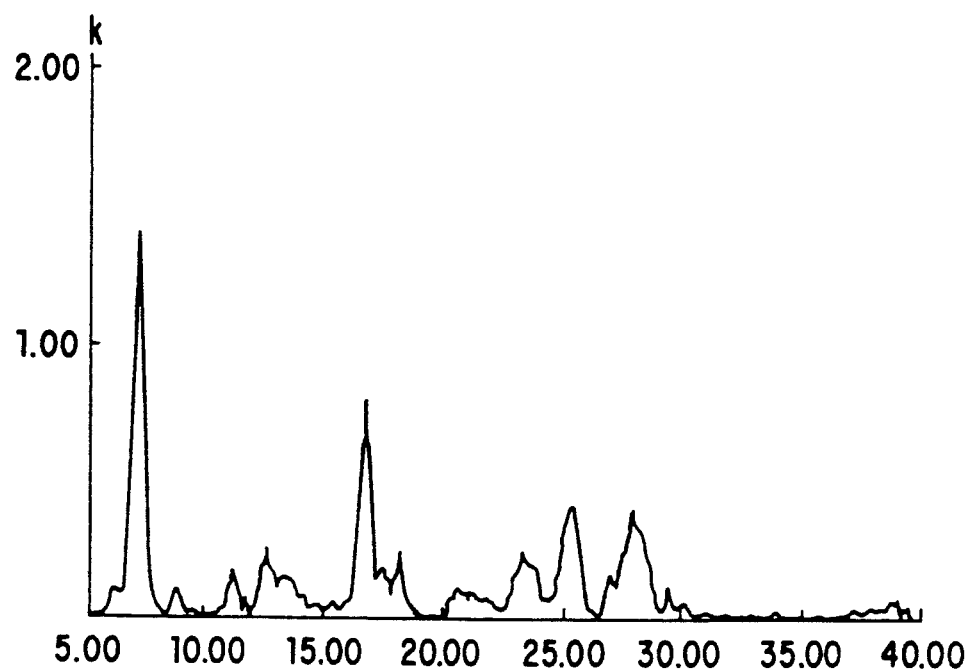

| Example No. | Crystal of Mixed Pigments | Solvent | X-ray Diffraction Pattern |
| --- | --- | --- | --- |
| 20 | Example 17 | monochlorobenzene | FIG. 15 |
| 21 | " | THF | the same as FIG. 14 |
| 22 | " | methyl ethyl ketone | the same as FIG. 14 |
| 23 | " | ethylene glycol | FIG. 16 |
| 24 | " | DMF | the same as FIG. 14 |
| 25 | " | water/monochlorobenzene = 1/14 | FIG. 17 |
| 26 | Example 18 | methylene chloride | FIG. 18 |
| 27 | " | monochlorobenzene | FIG. 18 |
| 28 | " | THF | the same as FIG. 18 |
| 29 | " | methyl ethyl ketone | the same as FIG. 18 |
| 30 | " | ethylene glycol | FIG. 19 |
| 31 | " | DMF | the same as FIG. 18 |
| 32 | " | water/monochlorobenzene = 1/14 | the same as FIG. 18 |

COMPARATIVE EXAMPLE 1

Figure 20:
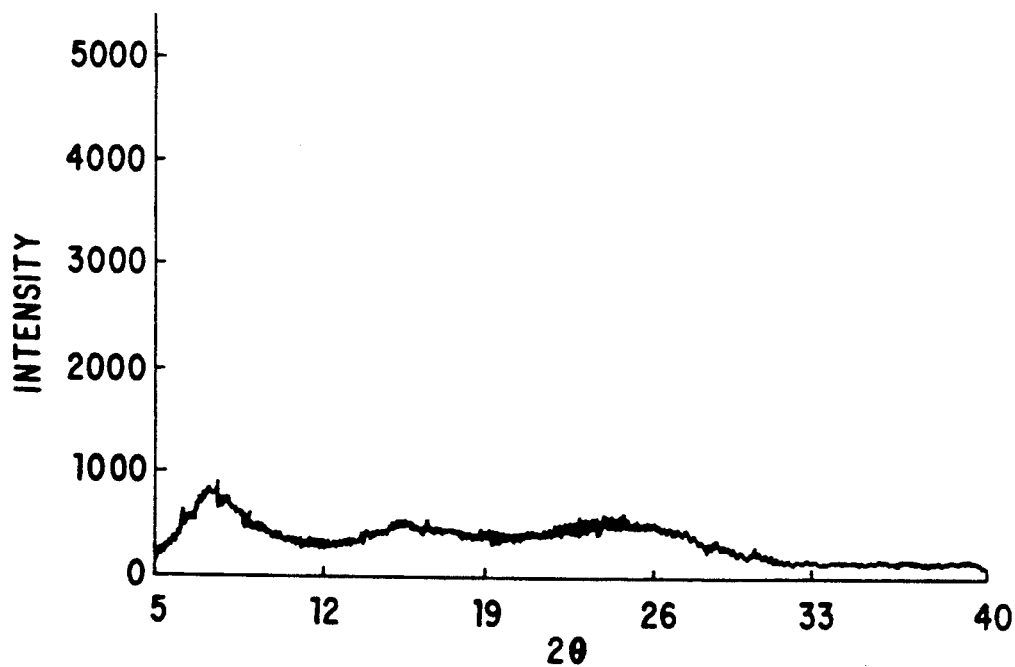
FIGS. 20 and 21 are powder X-ray diffraction patterns of the oxytitanium phthalocyanine crystals of Comparative Examples 1 and 2, respectively.

Ten parts of the oxytitanium phthalocyanine crystal obtained in Synthesis Example 1 were subjected to milling in the same manner as in Example 1, instead of 9 parts of the oxytitanium phthalocyanine crystal and 1 part of the chlorogallium phthalocyanine crystal. The powder X-ray diffraction pattern of the resulting powder is shown in FIG. 20.

COMPARATIVE EXAMPLE 2

Figure 21:
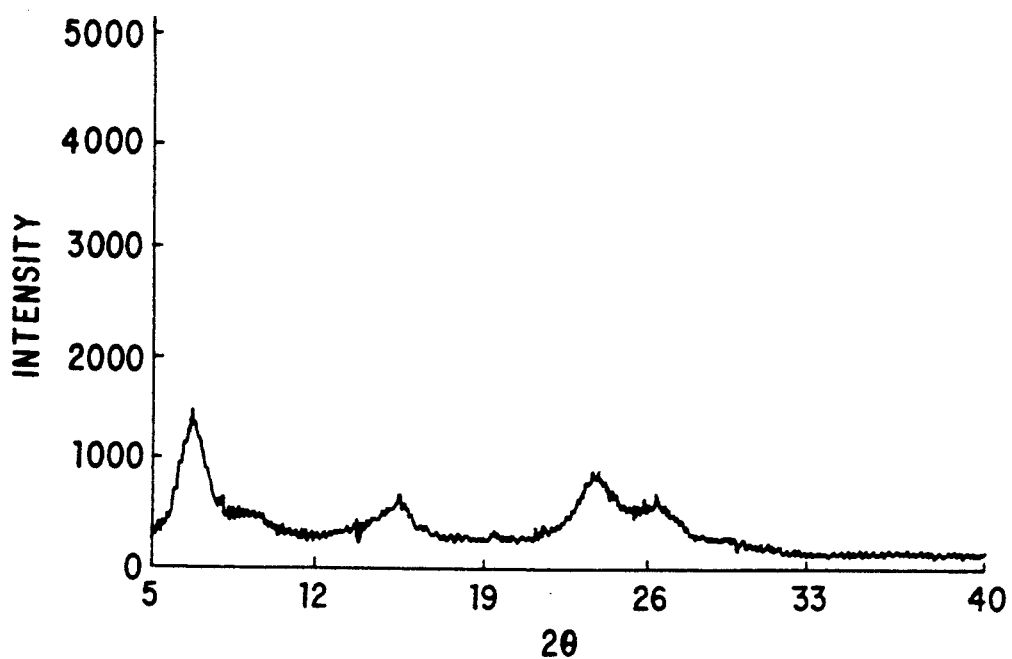

The same procedure as in Comparative Example 1 was repeated, except for decreasing the milling time to 1 hour. The powder X-ray diffraction pattern of the resulting powder is shown in FIG. 21.

COMPARATIVE EXAMPLE 3

Figure 22:
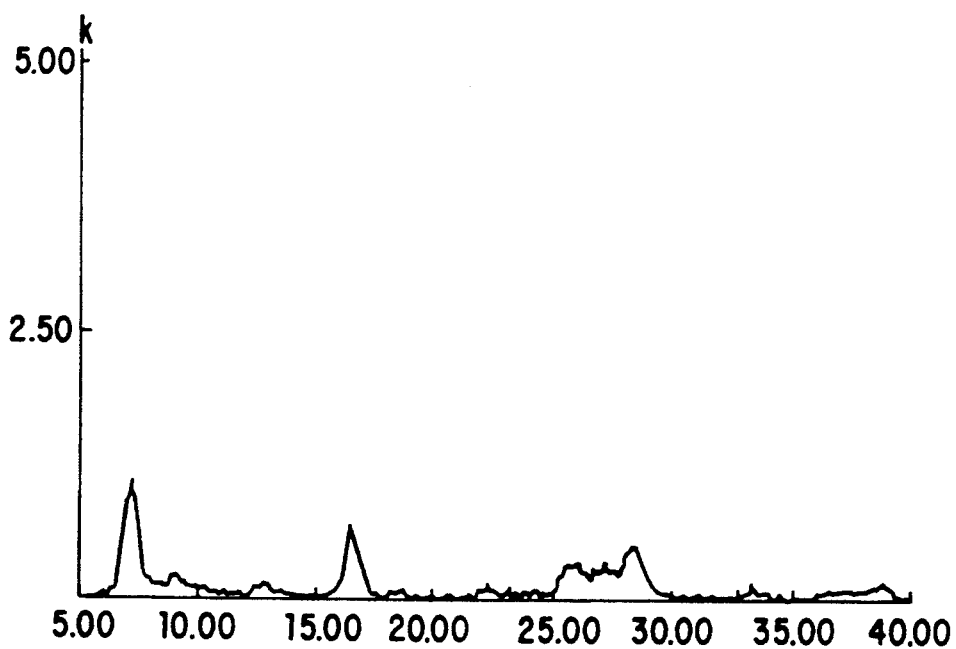
FIG. 22 is a powder X-ray diffraction pattern of the chlorogallium phthalocyanine crystal obtained in Comparative Example 3.

Ten parts of the chlorogallium phthalocyanine crystal obtained in Synthesis Example 2 were subjected to milling in the same manner as in Example 1, instead of 9 parts of the oxytitanium phthalocyanine crystal and 1 part of the chlorogallium phthalocyanine crystal. The powder X-ray diffraction pattern of the resulting powder is shown in FIG. 22.

COMPARATIVE EXAMPLES 4 TO 16

The ground crystal obtained in Comparative Examples 1, 2, or 3 was treated with the solvent shown in Table 3 below in the same manner as in Example 3. The Figure No. of the powder X-ray diffraction pattern of the resulting crystal is shown in Table 3.

TABLE 3

Figure 23:
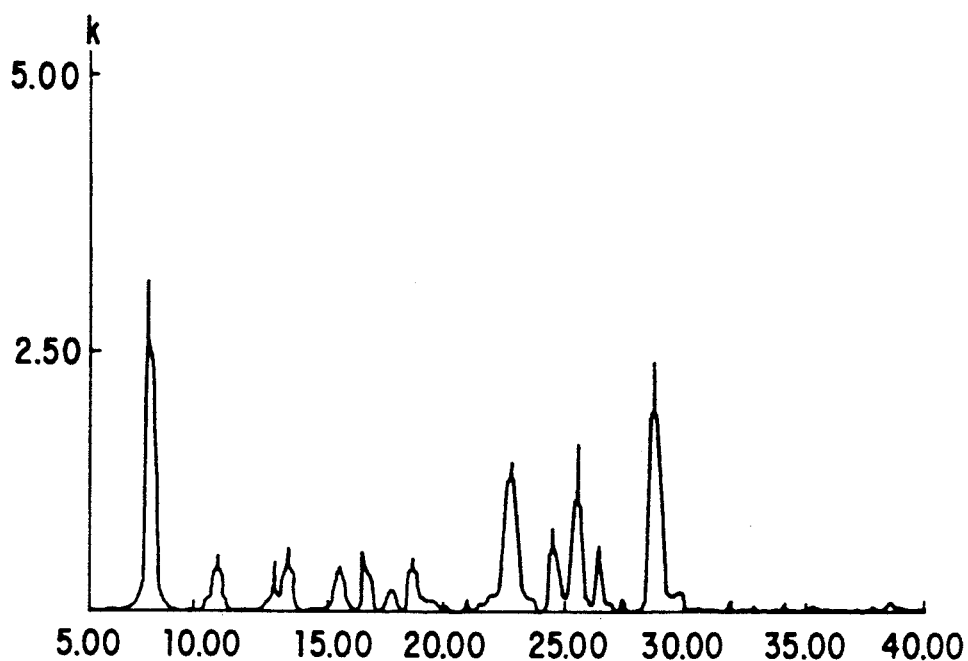
FIGS. 23 and 24 are powder X-ray diffraction patterns of the oxytitanium phthalocyanine crystals obtained in Comparative Examples 4 and 8, respectively.
Figure 24:
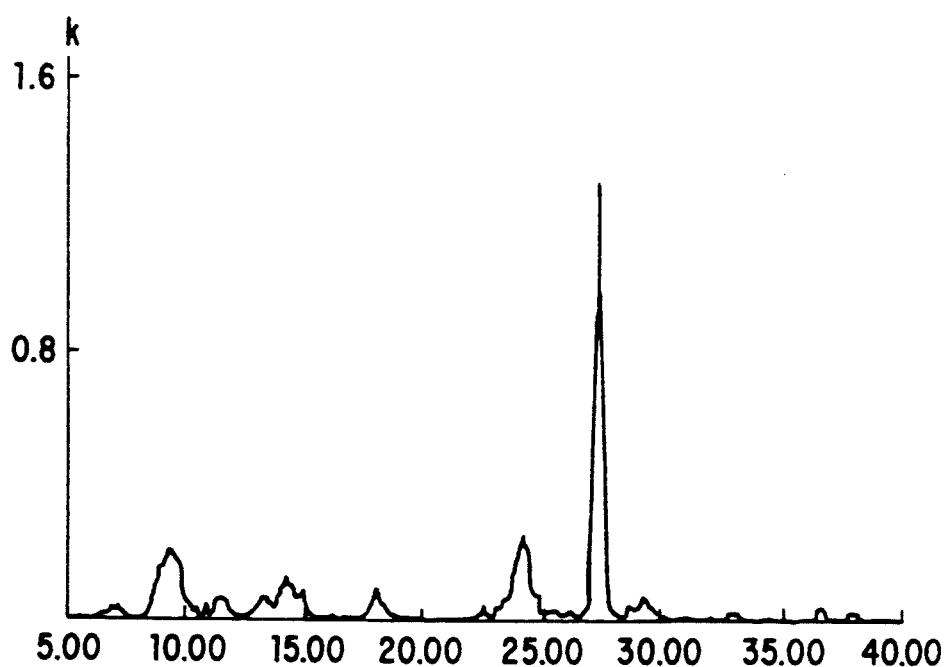
Figure 25:
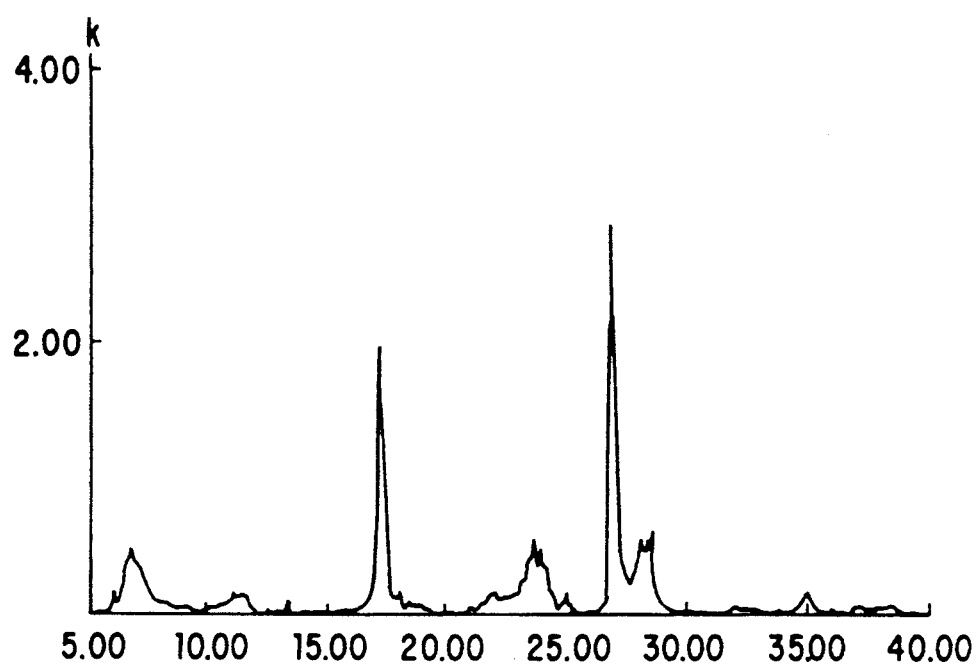
FIGS. 25 to 27 are powder X-ray diffraction patterns of the chlorogallium phthalocyanine crystals obtained in Comparative Examples 10, 11, and 14, respectively.
Figure 26:
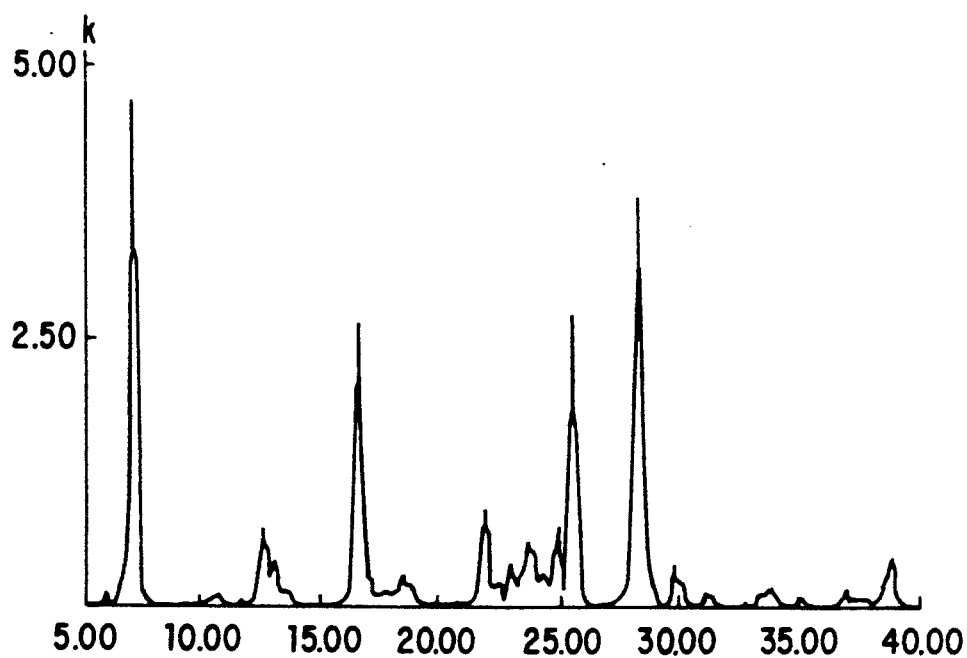
Figure 27:
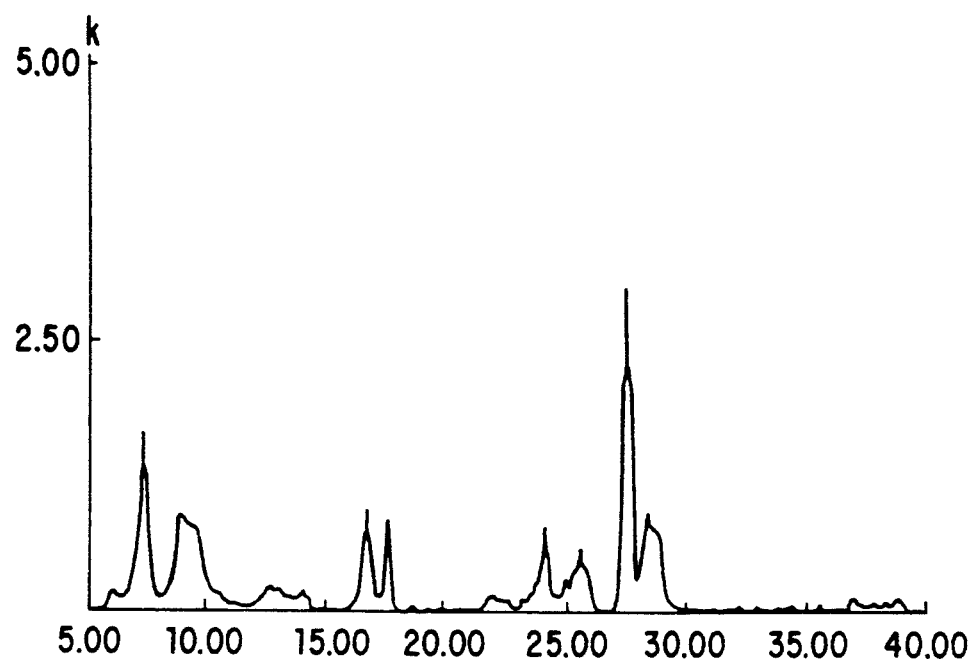

| Compara. Example No. | Crystal of Mixed Pigments | Solvent | X-ray Diffraction Pattern |
| --- | --- | --- | --- |
| 4 | Compara. Example 1 | methylene chloride | FIG. 23 |
| 5 | Compara. Example 1 | methyl ethyl ketone | the same as FIG. 23 |
| 6 | Compara. Example 1 | ethylene glycol | FIG. 7 |
| 7 | Compara. Example 1 | DMF | the same as FIG. 23 |
| 8 | Compara. Example 1 | water/monochlorobenzene = 1/14 | FIG. 24 |
| 9 | Compara. Example 2 | methylene chloride | the same as FIG. 6 |
| 10 | Compara. Example 3 | " | FIG. 25 |
| 11 | Compara. Example 3 | monochlorobenzene | FIG. 26 |
| 12 | Compara. Example 3 | THF | the same as FIG. 26 |
| 13 | Compara. Example 3 | methyl ethyl ketone | the same as FIG. 26 |
| 14 | Compara. Example 3 | ethylene glycol | FIG. 27 |
| 15 | Compara. Example 3 | DMF | the same as FIG. 26 |
| 16 | Compara. Example 3 | water/monochlorobenzene = 1/14 | the same as FIG. 26 |

COMPARATIVE EXAMPLE 17

Figure 28:
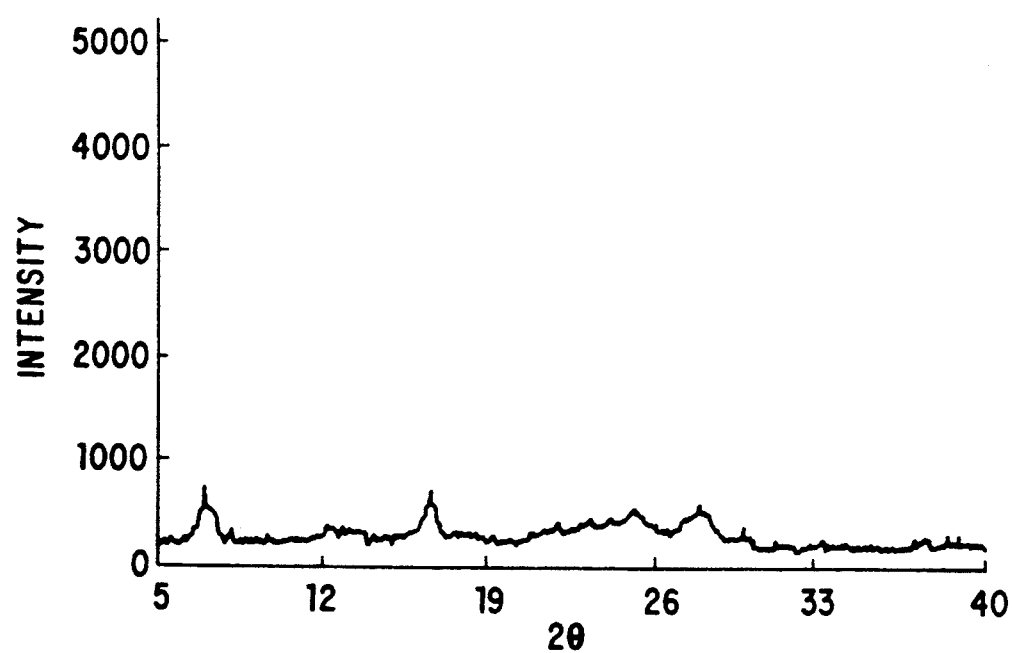
FIGS. 28 and 29 are powder X-ray diffraction patterns of the chloroindium phthalocyanine crystals obtained in Comparative Examples 17 and 18, respectively.

Ten parts of the chloroindium phthalocyanine crystal obtained in Synthesis Example 3 were subjected to milling in the same manner as in Example 1, instead of 9 parts of the oxytitanium phthalocyanine crystal and 1 part of the chlorogallium phthalocyanine crystal. The powder X-ray diffraction pattern of the resulting powder is shown in FIG. 28.

COMPARATIVE EXAMPLES 18 TO 21

The ground crystal obtained in Comparative Example 17 was treated with the solvent shown in Table 4 below in the same manner as in Example 19. The Figure No. of the powder X-ray diffraction pattern of the resulting crystal is shown in Table 4.

TABLE 4

Figure 29:
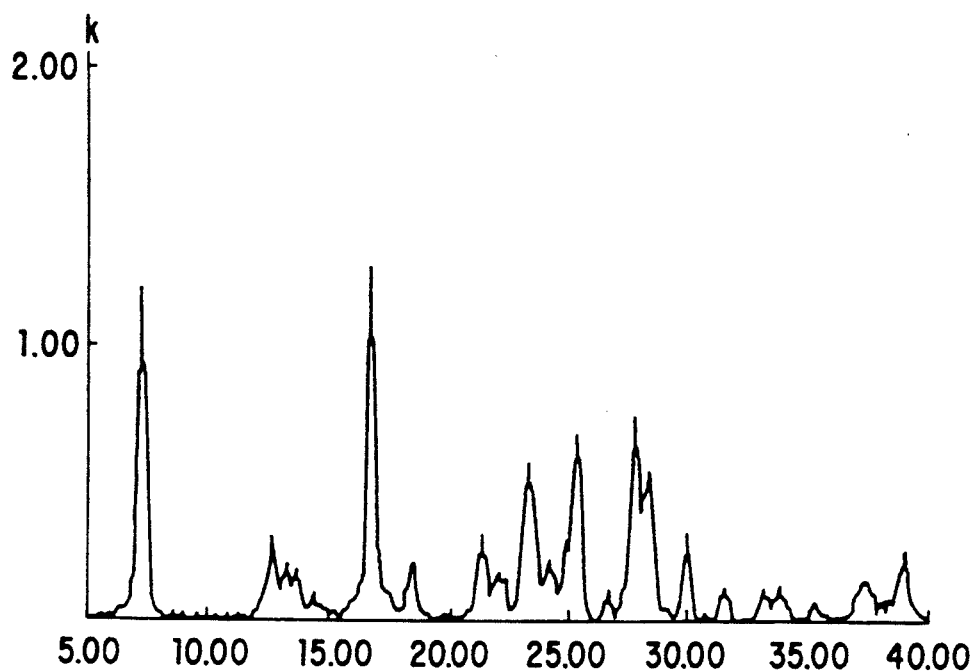

| Compara. Example No. | Solvent Used | X-ray Diffraction Pattern |
| --- | --- | --- |
| 18 | methylene chloride | FIG. 29 |
| 19 | THF | the same as FIG. 29 |
| 20 | ethylene glycol | the same as FIG. 29 |
| 21 | DMF | the same as FIG. 29 |

COMPARATIVE EXAMPLE 22

Figure 30:
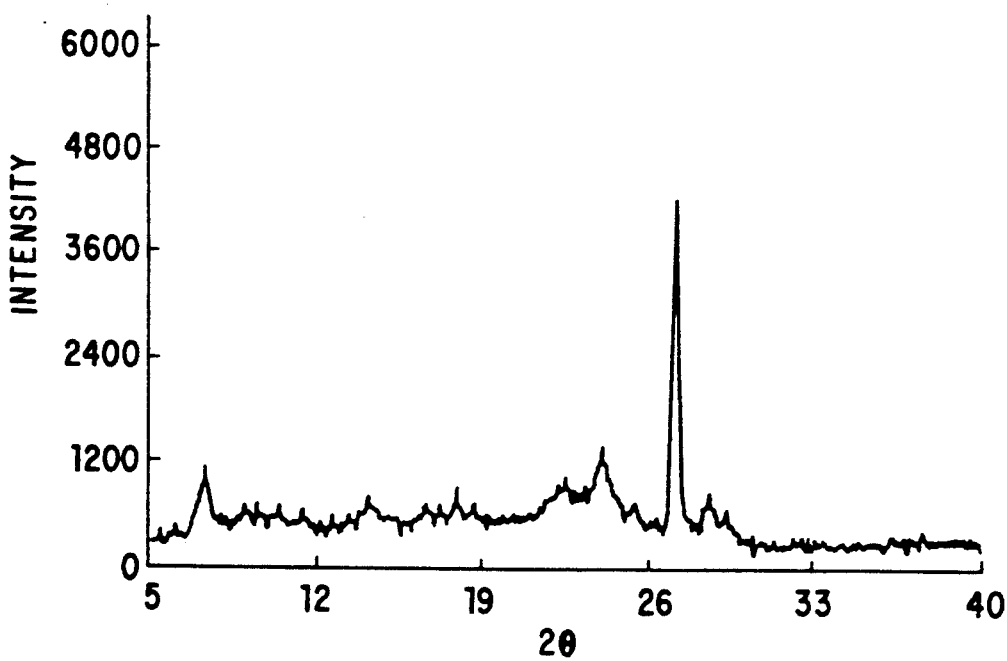
FIG. 30 is a powder X-ray diffraction pattern of the oxytitanium phthalocyanine crystal obtained in Comparative Example 22.

In 750 parts of α-chloronaphthalene was added 97.5 parts of o-phthalonitrile. After the mixture was thoroughly stirred in a nitrogen stream, 22 parts of titanium tetrachloride was added thereto dropwise. The temperature was gradually elevated up to 200° C., at which the mixture was allowed to react for 3 hours. After completion of the reaction, the reaction mixture was allowed to cool to 100° C., and the precipitated crystal was collected by filtration, washed with 200 parts of α-chloronaphthalene previously heated to 100° C. and then successively with 300 parts of α-chloronaphthalene and 300 parts of methanol. The crystal was dispersed in 800 parts of methanol and stirred at reflux for 1 hour. The crystal was filtered and dispersed in 700 parts of distilled water, followed by stirring at 60° C. for 1 hour. The washing with water was repeated 10 times. The final filtrate had a pH of 6.0. The resulting wet cake was freeze-dried to obtain 70 parts of an oxytitanium phthalocyanine crystal. The powder X-ray diffraction pattern of the resulting crystal is shown in FIG. 30.

Figure 31:
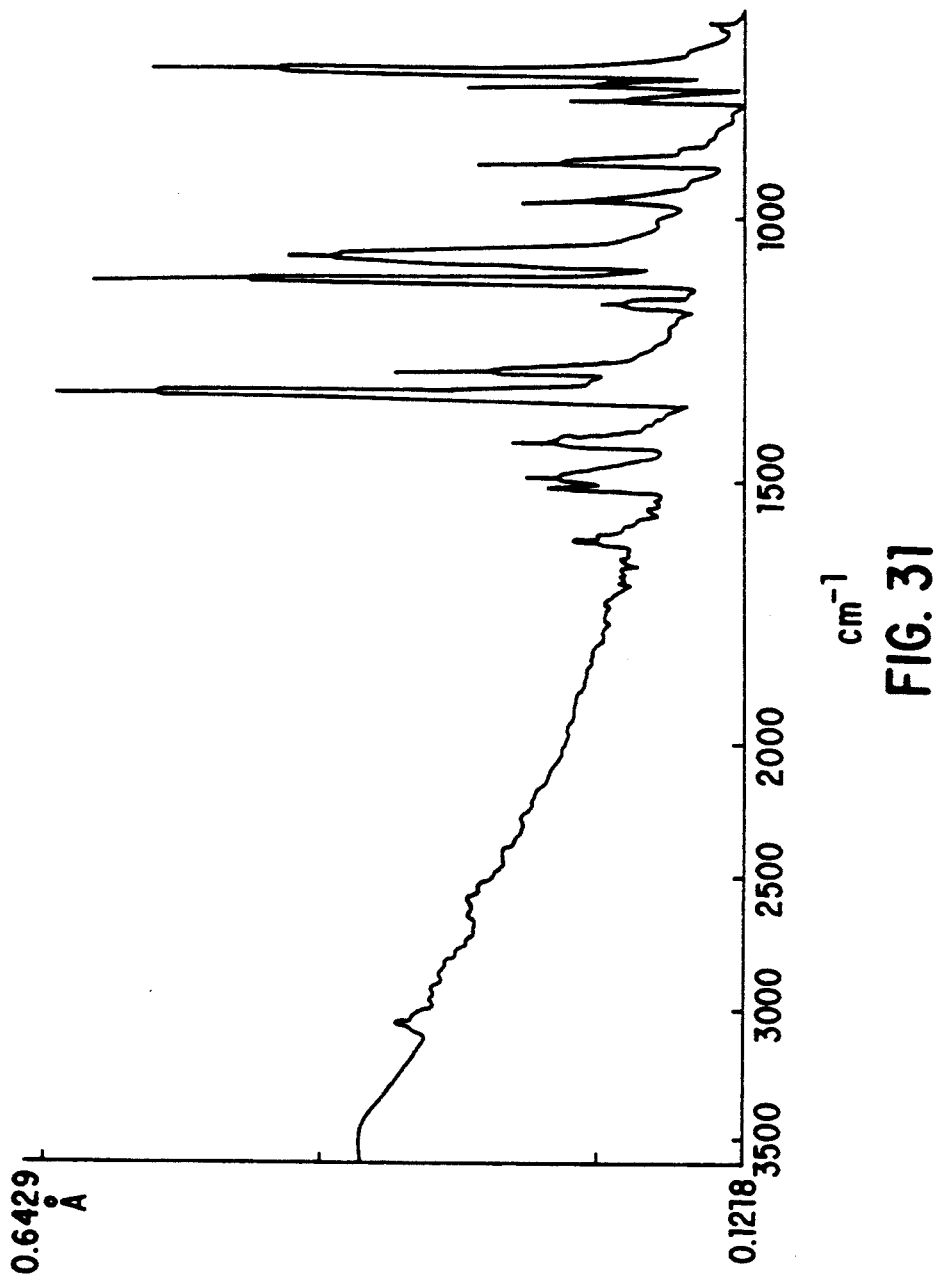
FIG. 31 is an infrared absorption spectrum of the oxytitaniumphthalocyanine-chlorogalliumphthalocyanine crystal obtained in Example 10.
Figure 32:
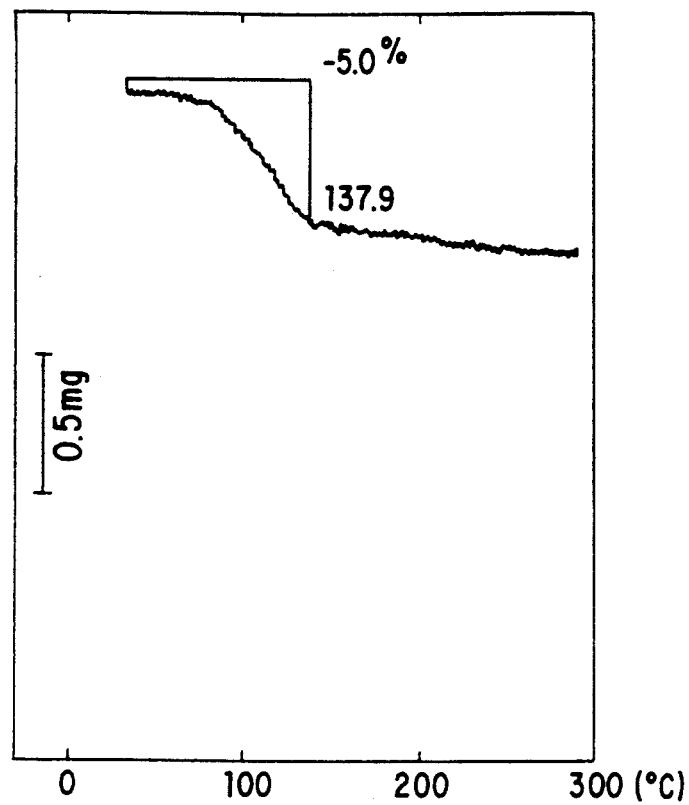
FIG. 32 is a thermogram of the oxytitanium phthalocyanine-chlorogallium phthalocyanine crystal obtained in Example 10.
Figure 34:
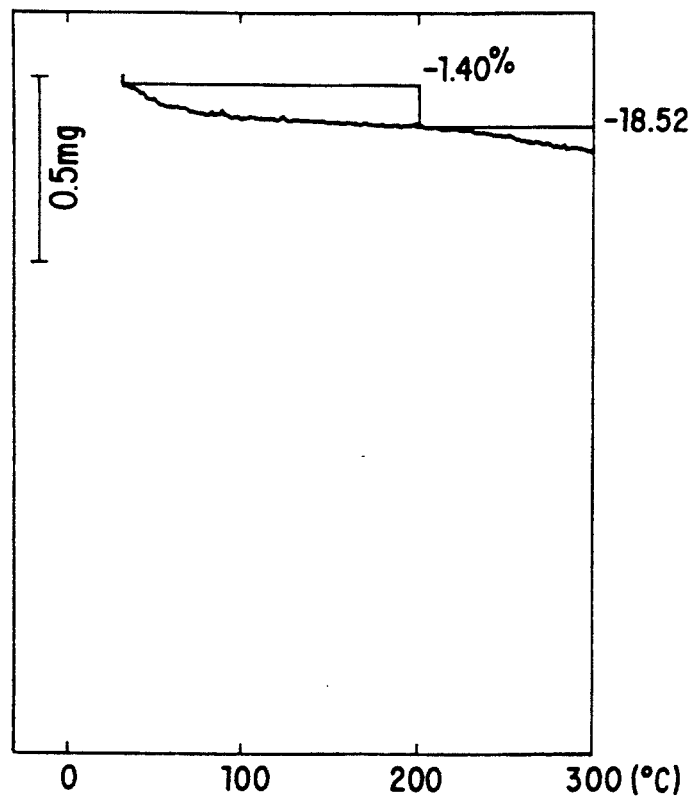
FIG. 34 is a thermogram of the oxytitanium phthalocyanine crystal obtained in Comparative Example 8.
Figure 33:
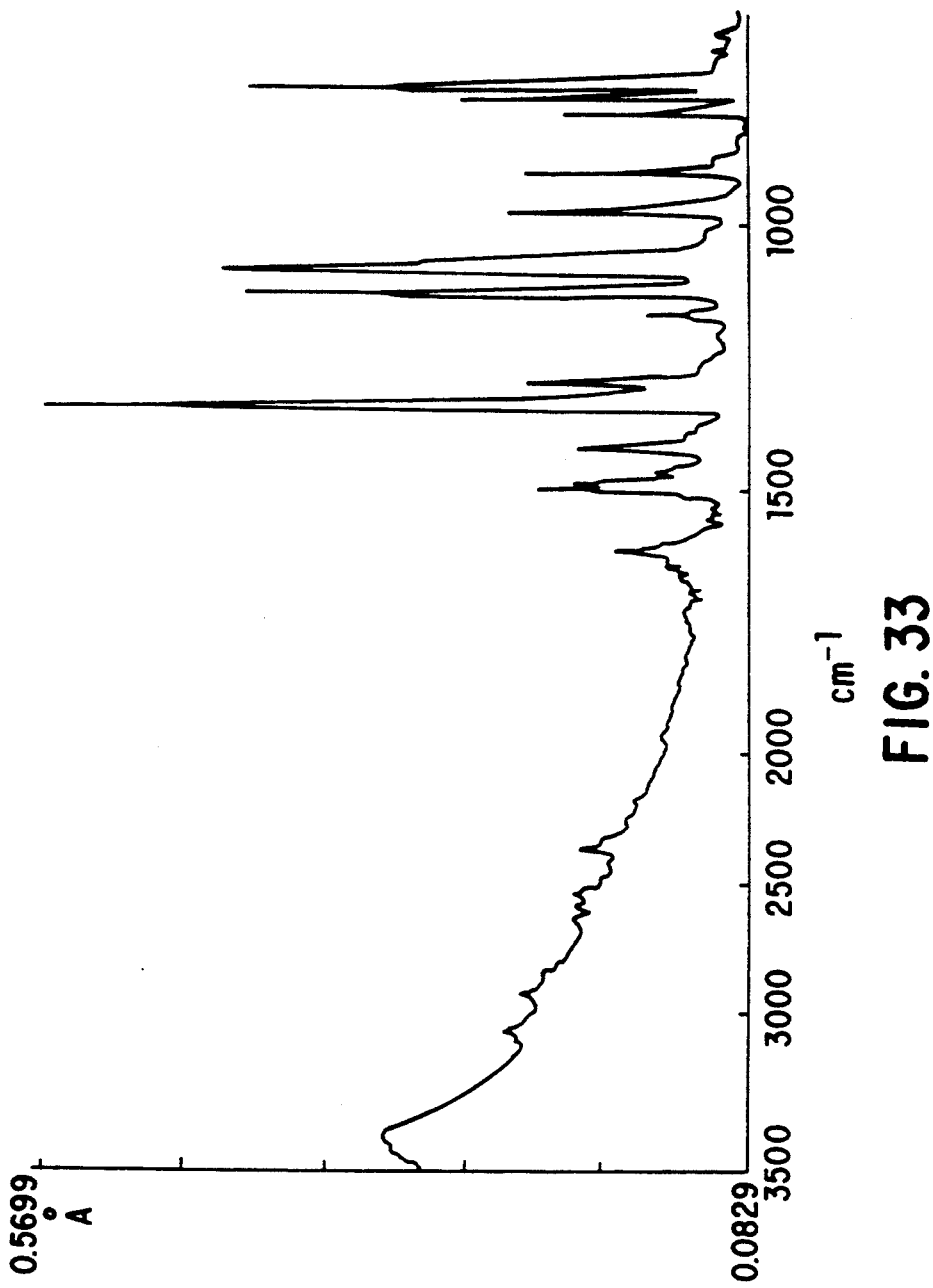
FIG. 33 is an infrared absorption spectrum of the oxytitanium phthalocyanine crystal obtained in Comparative Example 8.
Figure 35:
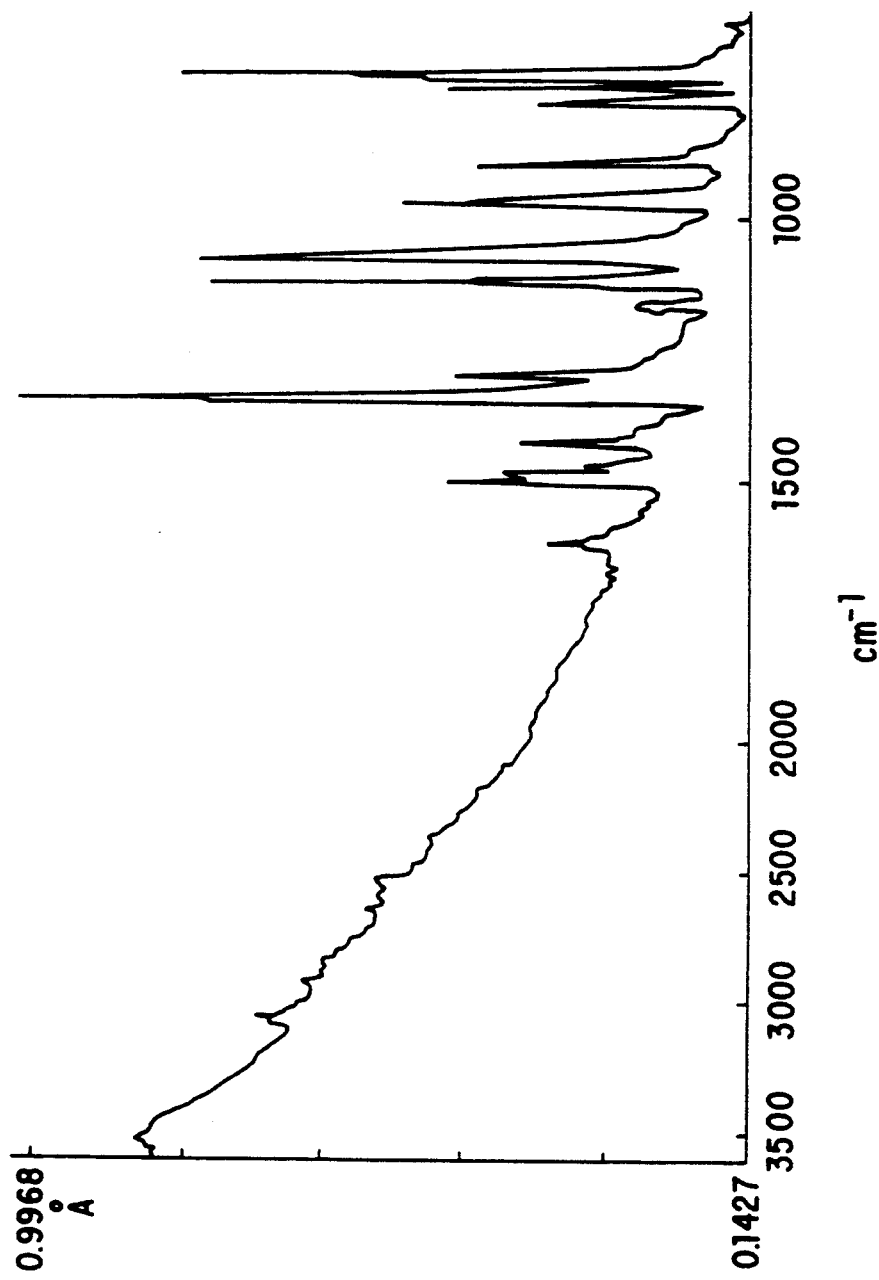
FIG. 35 is an infrared absorption spectrum of the oxytitanium phthalocyanine crystal obtained in Comparative Example 17.
Figure 36:
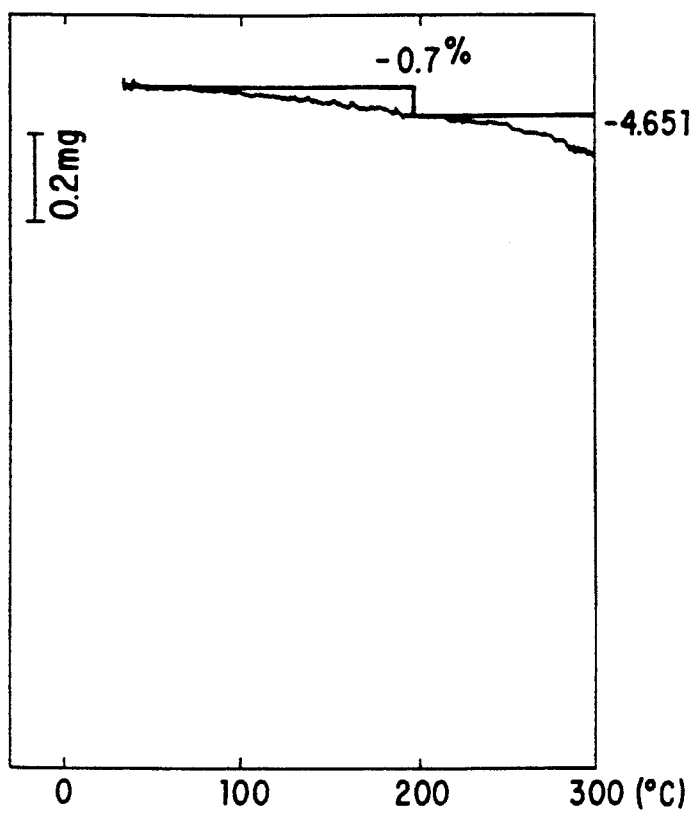
FIG. 36 is a thermogram of the oxytitanium phthalocyanine crystal obtained in Comparative Example 17.
Figure 37:
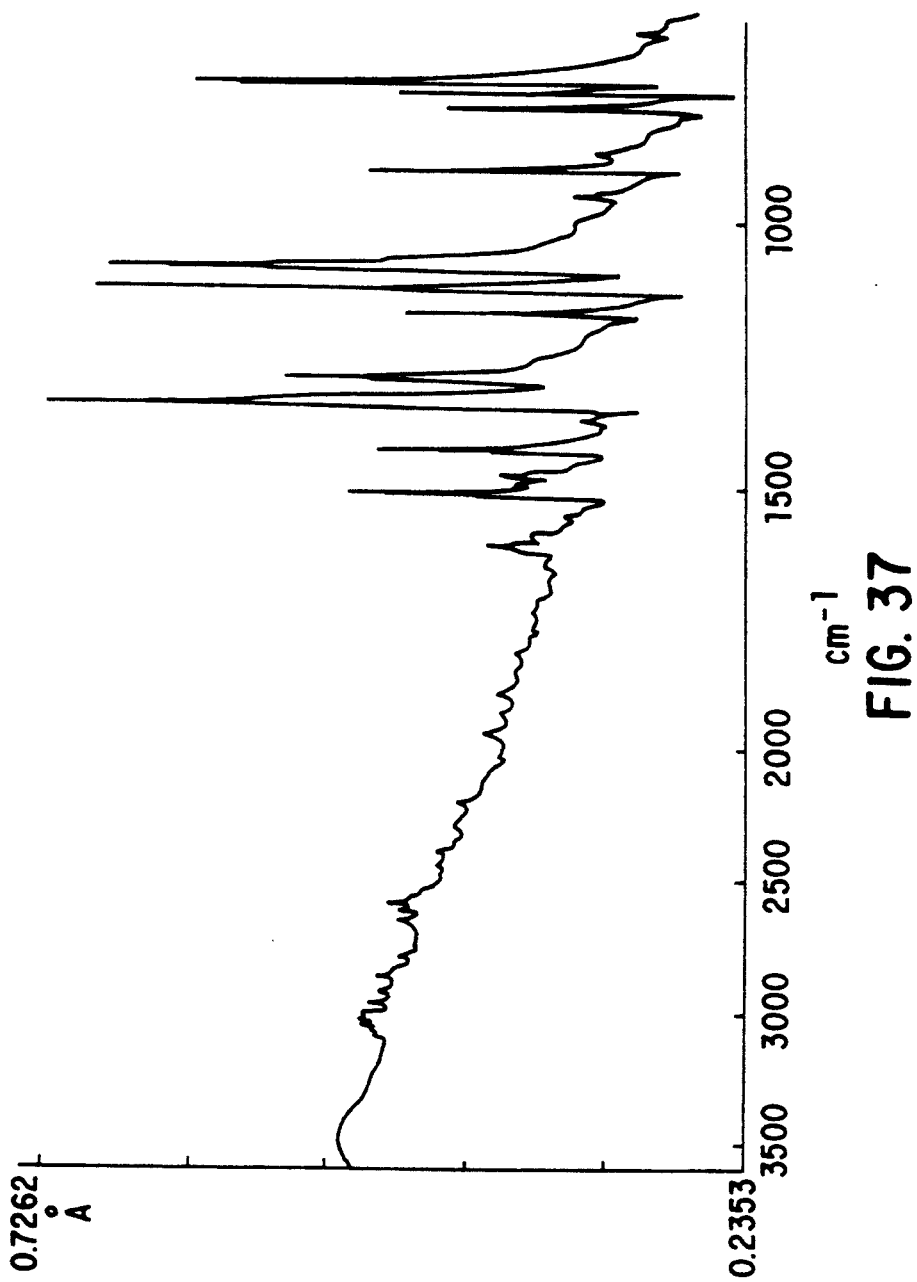
FIG. 37 is an infrared absorption spectrum of a chlorogallium phthalocyanine crystal.
Figure 39A:
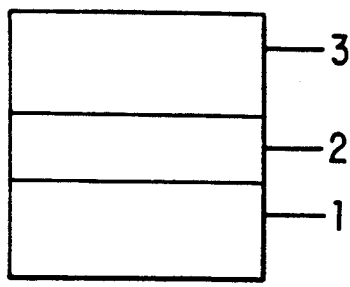
Figure 39B:
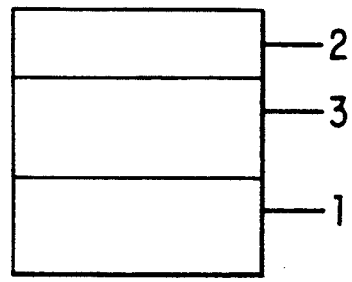
Figure 39C:
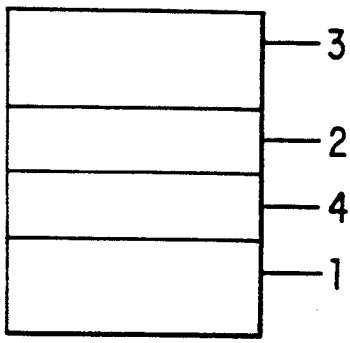
Figure 39D:
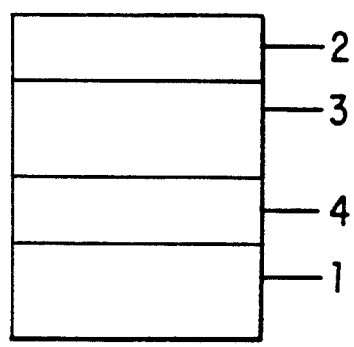

The phthalocyanine crystal of mixed pigments according to the present invention was compared with the conventional crystal forms. The infrared absorption spectrum and the thermogram of the phthalocyanine crystal of mixed pigments obtained in Example 10 are shown in FIGS. 31 and 32, respectively. The infrared absorption spectrum and the thermogram of the oxytitanium phthalocyanine crystal obtained in Comparative Example 8 are shown in FIGS. 33 and 34, respectively. The infrared absorption spectrum and the thermogram of the oxytitanium phthalocyanine crystal obtained in Comparative Example 17 are shown in FIGS. 35 and 36, respectively. The infrared absorption spectrum of the chlorogallium phthalocyanine crystal obtained in Synthesis Example 2 is shown in FIG. 37. It is apparent from these figures that the phthalocyanine crystal of mixed pigments according to the present invention differs from any of the conventionally known phthalocyanine crystal forms.

EXAMPLE 33

Figure 38:
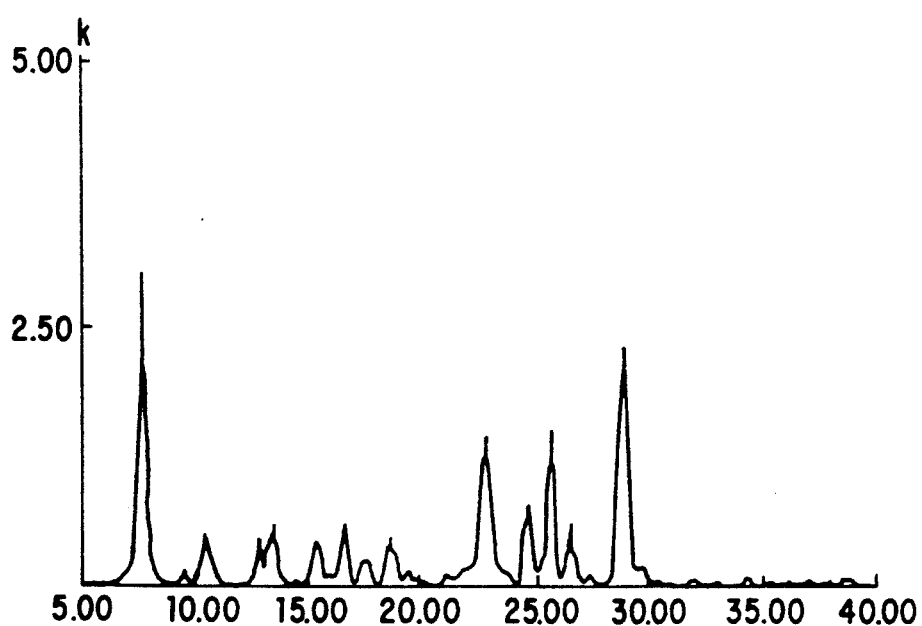
FIG. 38 is a powder X-ray diffraction pattern of the oxytitaniumphthalocyanine-chlorogalliumphthalocyanine crystal obtained in Example 33.

A mixture of 0.25 part of the amorphous oxytitanium phthalocyanine crystal obtained in Comparative Example 1 and 0.25 part of the crystal of mixed pigments obtained in Example 11 was subjected to a solvent treatment in the same manner as in Example 3. The powder X-ray diffraction pattern of the resulting crystal of mixed pigments is shown in FIG. 38.

EXAMPLE 34

A coating composition comprising 10 parts of an organozirconium compound ("ORGATICS ZC540" produced by Matsumoto Seiyaku K. K.), 2 parts of a silane coupling agent ("A1110" produced by Nippon Unicar K. K.), 30 parts of isopropyl alcohol, and 30 parts of n-butanol was coated on an aluminum-plated substrate by dip coating and dried at 150° C. for 5 minutes to form a 0.1 μm thick subbing layer.

A mixture of 0.1 part of the oxytitanium phthalocyanine-chlorogallium phthalocyanine crystal obtained in Example 3, 0.1 part of polyvinyl butyral ("S-Lec BM-S" produced by Sekisui Chemical Co., Ltd.), and 10 parts of cyclohexanone was dispersed in a paint shaker together with glass beads for 1 hour to prepare a coating composition. The resulting coating composition was coated on the subbing layer by dip coating and dried at 100° C. for 5 minutes to form a 0.2 μm thick charge generating layer.

In 8 parts of monochlorobenzene were dissolved 1 part of a compound of formula (1) shown below and 1 part of poly(4,4-cyclohexylidenediphenylene carbonate) of formula (2) shown below, and the resulting coating composition was coated on the charge generating layer by dip coating and dried at 120° C. for 1 hour to form a 15 μm thick charge transporting layer.

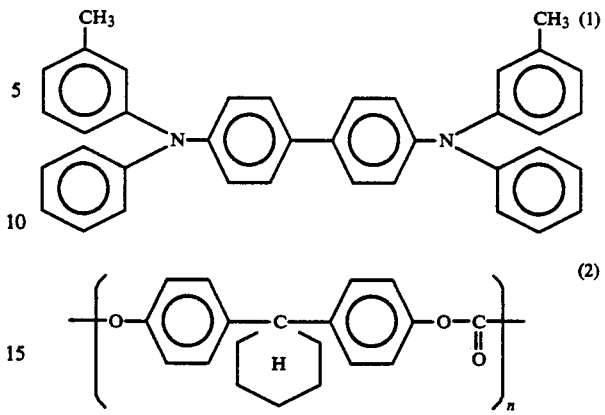

EXAMPLE 35 TO 41

An electrophotographic photoreceptor was produced in the same manner as in Example 34, except for replacing the oxytitaniumphthalocyanine-chlorogalliumphthalocyanine crystal with the charge generating material shown in Table 5 below.

COMPARATIVE EXAMPLES 23 TO 28

An electrophotographic photoreceptor was produced in the same manner as in Example 34, except for replacing the oxytitaniumphthalocyanine-chlorogalliumphthalocyanine crystal with the charge generating material shown in Table 5.

EXAMPLE 42

An electrophotographic photoreceptor was produced in the same manner as in Example 34, except for replacing the oxytitaniumphthalocyanine-chlorogalliumphthalocyanine crystal with 0.1 part of the mixed crystal obtained in Example 19.

EXAMPLES 43 TO 47

An electrophotographic photoreceptor was produced in the same manner as in Example 34, except for replacing the oxytitaniumphthalocyanine-chlorogalliumphthalocyanine crystal with the charge generating material shown in Table 5.

COMPARATIVE EXAMPLES 29 TO 31

An electrophotographic photoreceptor was produced in the same manner as in Example 34, except for replacing the oxytitaniumphthalocyanine-chlorogalliumphthalocyanine crystal with the charge generating material shown in Table 5.

Electrophotographic characteristics of each of the electrophotographic photoreceptors prepared in Examples 34 to 46 and Comparative Examples 23 to 31 were evaluated by making the following measurements with a flat plate scanner under a normal temperature and normal humidity condition (20° C., 40% RH). The results obtained are shown in Table 5.

1) Initial Surface Potential

The photoreceptor was charged to −6.0 kV by a corona discharge, and the surface potential after 1 second ($V_{DDP}$) was measured.

2) Light Decay Rate

The negatively charged photoreceptor was exposed to monochromatic light (780 nm) isolated through a band transmission filter to determine a decay rate of the potential (dV/dE).

Residual Potential

The negatively charged photoreceptor was exposed to white light of 50 erg/cm² for 0.5 second, and the residual surface potential ($V_{RP}$) was measured.

4) Durability

The above-described charging and exposure were repeated 1000 times, and $V_{DDP}$ and $V_{RP}$ were measured to obtain a difference from those in the initial stage ($\Delta V_{DDP}$, $\Delta V_{RP}$).

TABLE 5

| Example No. | Charge Generating Material | Initial Electrophotographic Characteristics | | | Durability | |
|---|---|---|---|---|---|---|
| | | $V_{DDP}$ (V) | dV/dE (Vcm²/erg) | $V_{RP}$ (V) | $\Delta V_{DDP}$ (V) | $\Delta V_{RP}$ (V) |
| Example 34 | Example 3 | −500 | 77 | −12 | 20 | 5 |
| Example 35 | Example 7 | −480 | 73 | −15 | 30 | 12 |
| Example 36 | Example 8 | −480 | 107 | −10 | 15 | 3 |
| Example 37 | Example 10 | −490 | 105 | −10 | 10 | 3 |
| Example 38 | Example 12 | −520 | 80 | −15 | 10 | 11 |
| Example 39 | Example 14 | −450 | 72 | −15 | 15 | 13 |
| Example 40 | Example 15 | −520 | 81 | −12 | 13 | 11 |
| Example 41 | Example 16 | −550 | 75 | −13 | 20 | 7 |
| Example 42 | Example 19 | −480 | 70 | −10 | 15 | 5 |
| Example 43 | Example 20 | −500 | 75 | −10 | 20 | 5 |
| Example 44 | Example 23 | −450 | 60 | −20 | 30 | 12 |
| Example 45 | Example 25 | −500 | 120 | −10 | 10 | 5 |
| Example 46 | Example 26 | −490 | 85 | −15 | 20 | 11 |
| Example 47 | Example 30 | −450 | 95 | −15 | 25 | 10 |
| Compara. Example 23 | Compara. Example 6 | −450 | 34 | −30 | 50 | 20 |
| Compara. Example 24 | Compara. Example 7 | −500 | 70 | −11 | 10 | 5 |
| Compara. Example 25 | Compara. Example 9 | −520 | 63 | −13 | 30 | 7 |
| Compara. Example 26 | Compara. Example 10 | −520 | 62 | −15 | 25 | 15 |
| Compara. Example 27 | Compara. Example 14 | −470 | 50 | −18 | 30 | 20 |
| Compara. Example 28 | Compara. Example 16 | −500 | 58 | −20 | 30 | 20 |
| Compara. Example 29 | Compara. Example 4 | −480 | 65 | −11 | 20 | 7 |
| Compara. Example 30 | Compara. Example 19 | −520 | 60 | −30 | 50 | 15 |
| Compara. Example 31 | Compara. Example 21 | −430 | 80 | −20 | 40 | 10 |

The phthalocyanine crystal of mixed pigments according to the present invention, of oxytitanium phthalocyanine and a halogenated gallium phthalocyanine or a halogenated indium phthalocyanine in a novel crystal form, serves as an excellent charge generating material to provide a highly reliable electrophotographic photoreceptor having high sensitivity, excellent stability on repeated use, and excellent environmental stability.

While the invention has been described in detail and with reference to specific examples thereof, it will be apparent to one skilled in the art that various changes and modifications can be made therein without departing from the spirit and scope thereof.

What is claimed is:

1. A phthalocyanine crystal of mixed pigments of oxytitanium phthalocyanine and a halogenated gallium phthalocyanine or a halogenated indium phthalocyanine.

2. A phthalocyanine crystal of mixed pigments as claimed in claim 1, wherein said crystal is made of mixed pigments of oxytitanium phthalocyanine and chlorogallium phthalocyanine.

3. A phthalocyanine crystal of mixed pigments as claimed in claim 1, wherein said crystal is made of mixed pigments of oxytitanium phthalocyanine and a halogenated gallium phthalocyanine and has a maximum X-ray diffraction peak at a Bragg angle ($2\theta \pm 0.2°$) of 27.2°.

4. A phthalocyanine crystal of mixed pigments as claimed in claim 1, wherein said crystal is made of mixed pigments of oxytitanium phthalocyanine and a halogenated gallium phthalocyanine and has an X-ray diffraction peak at Bragg angles ($2\theta \pm 0.2°$) of 8.9° and 27.0°.

5. A phthalocyanine crystal of mixed pigments as claimed in claim 1, wherein said crystal is made of mixed pigments of oxytitanium phthalocyanine and a halogenated gallium phthalocyanine and has an X-ray diffraction peak at Bragg angles ($2\theta \pm 0.2°$) of 9.3°, 10.6°, 13.3°, 15.1°, and 26.3°.

6. A phthalocyanine crystal of mixed pigments as claimed in claim 1, wherein said crystal is made of mixed pigments of oxytitanium phthalocyanine and a halogenated gallium phthalocyanine and has an X-ray diffraction peak at Bragg angles ($2\theta \pm 0.2°$) of 7.4°, 11.1°, 17.9°, 20.1°, 26.6°, and 29.2°.

7. A phthalocyanine crystal of mixed pigments as claimed in claim 1, wherein said crystal is made of mixed pigments of oxytitanium phthalocyanine and a halogenated gallium phthalocyanine and has an X-ray diffraction peak at Bragg angles ($2\theta \pm 0.2°$) of 7.5°, 16.7°, 22.1°, 24.7°, 25.6°, and 28.6°.

8. A phthalocyanine crystal of mixed pigments as claimed in claim 1, wherein said crystal is made of mixed pigments of oxytitanium phthalocyanine and a halogenated gallium phthalocyanine and has an X-ray diffraction peak at Bragg angles ($2\theta \pm 0.2°$) of 7.6°, 16.7°, 22.5°, 24.2°, 25.3°, and 28.6°.

9. A phthalocyanine crystal of mixed pigments as claimed in claim 1, wherein said crystal is made of oxytitanium phthalocyanine and chloroindium phthalocyanine.

10. A phthalocyanine crystal of mixed pigments as claimed in claim 1, wherein said crystal is made of mixed pigments of oxytitanium phthalocyanine and a halogenated indium phthalocyanine and has an X-ray diffraction peak at Bragg angles ($2\theta \pm 0.2°$) of 7.6°, 16.4°, 22.4°, 25.5°, and 28.6°.

11. A phthalocyanine crystal of mixed pigments as claimed in claim 1, wherein said crystal is made of mixed pigments of oxytitanium phthalocyanine and a halogenated indium phthalocyanine and has an X-ray diffraction peak at Bragg angles ($2\theta \pm 0.2°$) of 7.6°, 10.6°, 15.2°, 26.3°, and 28.7°.

12. A phthalocyanine crystal of mixed pigments as claimed in claim 1, wherein said crystal is made of mixed pigments of oxytitanium phthalocyanine and a halogenated indium phthalocyanine and has an X-ray diffraction peak at Bragg angles ($2\theta \pm 0.2°$) of 7.5°, 11.1°, 18.1°, 20.3°, 26.7°, and 29.2°.

13. A phthalocyanine crystal of mixed pigments as claimed in claim 1, wherein said crystal is made of mixed pigments of oxytitanium phthalocyanine and a halogenated indium phthalocyanine and has an X-ray diffraction peak at Bragg angles ($2\theta \pm 0.2°$) of 9.4°, 15.2°, 26.4°, and 27.4°.

14. A phthalocyanine crystal of mixed pigments as claimed in claim 1, wherein said crystal is made of mixed pigments of oxytitanium phthalocyanine and a halogenated indium phthalocyanine and has an X-ray diffraction peak at Bragg angles (2θ±0.2) of 7.4°, 16.6°, 25.3°, and 28.2°.

15. A phthalocyanine crystal of mixed pigments as claimed in claim 1, wherein said crystal is made of mixed pigments of oxytitanium phthalocyanine and a halogenated indium phthalocyanine and has an X-ray diffraction peak at Bragg angles (2θ±0.2°) of 7.3°, 16.7°, 25.3°, and 27.8°.

16. An electrophotographic photoreceptor comprising a conductive substrate having formed thereon a photosensitive layer containing, as a charge generating material, a phthalocyanine crystal of mixed pigments of oxytitanium phthalocyanine and a halogenated gallium phthalocyanine or a halogenated indium phthalocyanine.

17. An electrophotographic photoreceptor as claimed in claim 16, wherein said phthalocyanine crystal of mixed pigments is made of oxytitanium phthalocyanine and chlorogallium phthalocyanine.

18. An electrophotographic photoreceptor as claimed in claim 16, wherein said phthalocyanine crystal of mixed pigments is made of oxytitanium phthalocyanine and chloroindium phthalocyanine.

* * * * *